US009948646B1

(12) United States Patent
Lai et al.

(10) Patent No.: US 9,948,646 B1
(45) Date of Patent: Apr. 17, 2018

(54) MACHINE TYPE COMMUNICATION INTERWORKING FUNCTION PROXY

(71) Applicant: Syniverse Technologies, LLC, Tampa, FL (US)

(72) Inventors: Danh Lai, Fremont, CA (US); Prashant Datar, Tampa, FL (US); Rob Simonelli, Wesley Chapel, FL (US)

(73) Assignee: Syniverse Technologies, LLC, Tampa, FL (US)

( * ) Notice: Subject to any disclaimer, the term of this patent is extended or adjusted under 35 U.S.C. 154(b) by 0 days.

(21) Appl. No.: 15/645,576

(22) Filed: Jul. 10, 2017

Related U.S. Application Data

(60) Provisional application No. 62/360,072, filed on Jul. 8, 2016.

(51) Int. Cl.

| | |
|---|---|
| *H04L 29/06* | (2006.01) |
| *H04W 12/04* | (2009.01) |
| *H04W 12/06* | (2009.01) |
| *H04W 4/00* | (2018.01) |
| *H04W 92/02* | (2009.01) |

(52) U.S. Cl.
CPC ...... *H04L 63/0884* (2013.01); *H04L 63/0869* (2013.01); *H04W 4/005* (2013.01); *H04W 12/04* (2013.01); *H04W 12/06* (2013.01); *H04W 92/02* (2013.01)

(58) Field of Classification Search
CPC ............... H04W 4/003; H04W 4/005; H04W 92/00–92/24
See application file for complete search history.

(56) References Cited

U.S. PATENT DOCUMENTS

| | | | |
|---|---|---|---|
| 9,131,330 B2* | 9/2015 | Muhanna | H04W 4/005 |
| 2015/0208232 A1* | 7/2015 | Liebhart | H04W 4/005 370/328 |
| 2017/0347283 A1* | 11/2017 | Kodaypak | H04W 24/10 |

\* cited by examiner

*Primary Examiner* — Daniel Potratz
(74) *Attorney, Agent, or Firm* — Andriy Lytvyn; Smith & Hopen, P.A.

(57) ABSTRACT

A method of establishing connectivity between a mobile network operator (MNO) and a machine type communications (MTC) service provider. A machine type communications interworking function (MTC-IWF) Proxy is hosted on an IPX network service. MTC-IWF Proxy is connected to a MTC-IWF of the MNO and is also connected to a Service Capacities Center (SCS) of the MTC service provider. MTC-IWF Proxy connects to the MNO and the MTC service providers via trigger-service provider (Tsp) interface. Identity mapping services are provided between a first set of subscriber identifiers used by the MNO and a second set of subscriber identities used by the MTC service provider. The MTC-IWF Proxy hides the internal topology and relays signaling protocols used over a Tsp interface, thus enabling the MTC service providers and MNOs communicate without modifying their internal signaling protocols.

20 Claims, 27 Drawing Sheets

MACHINE TYPE COMMUNICATION INTERWORKING FUNCTION PROXY

BACKGROUND OF THE INVENTION

1. Field of the Invention

This invention relates to Telecommunications. More specifically, it relates to a system for establishing connectivity between Machine Type Communication (MTC) providers and Mobile Network Operators (MNOs).

2. Brief Description of the Related Art

With the rise of the Internet of Things (IoT) and Machine-Type-Communications (MTC), MNOs face a challenge of how to provide data services to large variety of devices executing various applications from Machine-To-Machine (M2M) and MTC service providers. Because various MNOs and MTC service providers use different internal signaling protocols their interoperability with one another is currently limited and difficult to deploy. Accordingly, there exists a need for a solution that would enable MNOs and MTC service providers to communicate with one another without having to alter their respective internal signaling protocols.

SUMMARY OF THE INVENTION

The invention is a method and a system of providing connectivity between a mobile network operator (MNO) and a machine-type-communications (MTC) service provider. The invention enables proper communication between one or more MNOs and one or more MTC service providers by deploying an MTC interworking function (MTC-IWF) Proxy to establish connection between the MTC-IWF on the MNO side and a Services Capabilities Server (SCS) on the MTC service provider's side.

In an embodiment, the invention utilizes an Internetwork Packet Exchange (IPX) hosted server for MTC-IWF Proxy. The MTC-IWF Proxy is separate from an MTC-IWF of the MNO. A first connection is established between the MTC-IWF of the MNO and the MTC-IWF Proxy. A second connection is established between the MTC-IWF Proxy and a Services Capabilities Server (SCS) of the MTC service provider. A third connection is established between a Packet Data Network Gateway (PGW) of the MNO and an Application Server (AS) of the MTC service provider. The first and second connections use a trigger-service provider (Tsp) interface, and the third connection is via the IPX. Identity mapping services are provided between a first set of subscriber identifiers used by the MNO and a second set of subscriber identities used by the MTC service provider, thereby enabling a many-to-many connection between multiple MNOs and multiple MTC service providers via the MTC-IWF Proxy.

The MTC-IWF Proxy enables the MNO and the MTC service provider to communicate with one another without modifying their internal signaling protocols. Mutual authentication and security is provided by a transport layer security (TLS), a datagram transport layer security (DTLS) or an internet key exchange (IPSec-IKEv2).

In an embodiment, the invention further includes a Service Capability Exposure Function (SCEF) Proxy hosted by the IPX. The SCEF Proxy communicates with a SCEF on the MNO side and also communicates with the SCS on the MTC service provider side. In this embodiment, the SCEF Proxy performs the identity mapping services mentioned above.

In an embodiment, the SCEF Proxy connects to the SCEF and the SCS via Application Programming Interface (API). In the present invention, the SCEF Proxy performs one or more functions selected from the group consisting of authentication and authorization; enabling external entities to discover service capabilities of the MTC service provider; policy enforcement; shielding the MNO from requests exceeding predefined permissions; accounting for monitoring events and/or non-IP data delivery (NIDD); and integrity protection, replay protection, and confidentiality protection of a subscriber. The international mobile subscriber identity (IMSI) of a subscriber is not sent outside of MNO's domain.

In an embodiment, the SCEF Proxy is coupled with the MTC-IWF Proxy.

BRIEF DESCRIPTION OF THE DRAWINGS

For a fuller understanding of the invention, reference should be made to the following detailed disclosure, taken in connection with the accompanying drawings, in which:

FIG. 16 is a data flow diagram for the procedure used by SCEF Proxy to report a change of NSI to SC S/AS;

DETAILED DESCRIPTION OF THE PREFERRED EMBODIMENT

Figure 1:
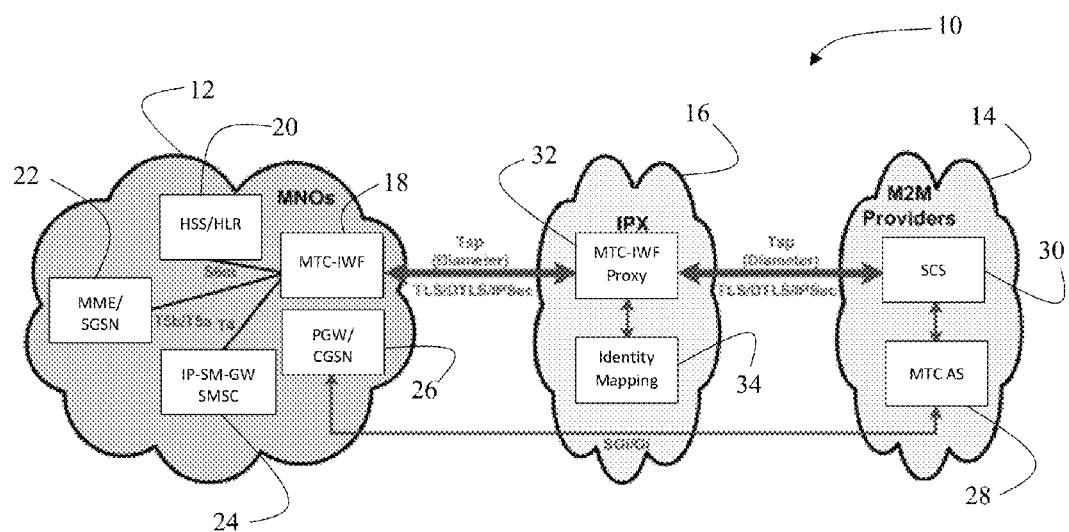
FIG. 1 is a diagram schematically depicting components of MTC-IWF proxy service.

The invention 10 is schematically depicted in FIG. 1. A Mobile Network Operator (MNO) 12 and a Machine-To-Machine (M2M)/Machine-Type Communications (MTC) service provider 14. Both MNO 12 and server provider 14 are connected to an Internetwork Packet Exchange (IPX) 16. MNO 12 includes a Machine-Type Communications Interworking Function (MTC-IWF) 18. MTC-IWF 18 communicates with MNO 12 components including HSS/HLR 20, MME/SGSN 22, and IP-SM-GW SMSC 24. MNO 12 further includes PGW/GGSN 26 which communicates with MTC Application Server (AS) 28 of service provider 14 via IPX server 16. Service provider 14 also includes a Services Capabilities Server (SCS) 30 in bilateral communication with AS 28. Service provider 14 uses SCS 30 for signaling between MTC-IWF 18 and AS 28. These network components are defined below.

1) MME/SGSN 22. The SGSN and MME specific functionality to support the Indirect and Hybrid models of MTC. They receive device triggers from the MTC-IWF 18. MME/SGSN 22 encapsulates device trigger information in a NAS message sent to the UE 50 used for MTC. They receive device trigger acknowledgements from the triggering UE 50. They report device trigger delivery success/failure status to the MTC-IWF 18. They may provide MME/SGSN 22 congestion/load information to the MTC-IWF 18. They monitor event configuration/reporting by the SCEF 38. The MME and SGSN 22 transfer non-IP data to the UE 50 using a Diameter connection to SCEF 38.

2) HSS/HLR 20. HSS/HLR 20 is a master user database that supports the IMS network entities that actually handle calls. They contain the subscription-related information (subscriber profiles), perform authentication and authorization of users and can provide information about a subscriber's location and IP information.

3) SCS 30. SCS 30 is an entity which connects to the 3GPP network to communicate with UEs 50 used for MTC and MTC-IWF 18 and/or SCEF 38 in the HPLMN. SCS 30 offers capabilities for use by one or multiple MTC Applications. UE 50 can host one or multiple MTC Applications. The corresponding MTC Applications in the external network are hosted on one or multiple AS 28.

Invention 10 introduces a MTC-IWF Proxy 32 hosted on IPX 16. MTC-IWF Proxy 32 is the functional entity that hides the internal network topology and relays/translates signaling protocols over a Tsp interface to invoke specific functionality in the Public Mobile Network (PLMN) (i.e., control plane device triggering). MTC-IWF Proxy 32 facilitates communications between MTC-IWF 18 on the MNO 12 side and SCS 30 on service provider 14 side. MTC-IWF Proxy 32 acts as MTC-IWF-side agent and, also, as SCS-side agent. MTC-IWF Proxy 32 communicates with both MNO's MTC-IWF 18 and SCS 30 of the MTC service provider 14 via Tsp interface. Tsp is a reference point used by a SCS 30 to communicate with the MTC-IWF 18 related CP signalling. Tsp supports the device trigger functionality, including reception of a device trigger request from SCS 30 that includes an Application Port ID used by the user equipment (UE) to route the trigger internally to the appropriate triggering function.

Authentication between MTC-IWF 18 and MTC-IWF Proxy 32 is accomplished using Diameter protocol over transmission control protocol (TCP) or stream control transmission protocol (SCTP) transport. Mutual Authentication and Security is provided by TLS for TCP transport, DTLS for SCTP transport, or IPSec-IKEv2. As illustrated in FIG. 1, this configuration enables MNO 12 to access multiple MTC/M2M service providers 14 and also enables a single MTC/M2M server provider 14 to connect to multiple MNOs 12. This constitutes a major advancement over the state of the art because MTC-IWF Proxy 32 eliminates a need for MNOs 12 and MTC/M2M service providers 14 to modify their signaling in order to communicate with each other.

Figure 2:
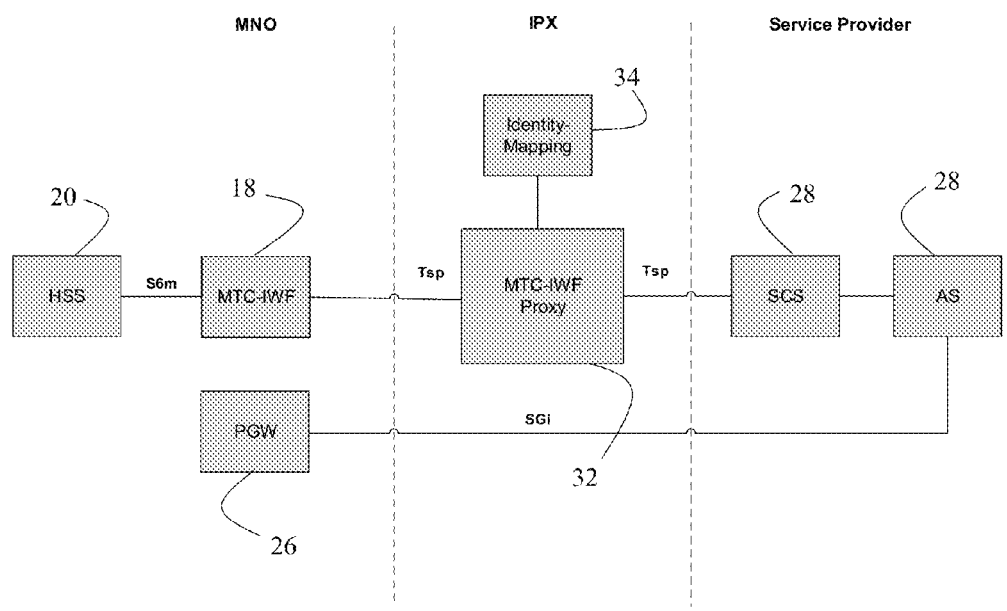
FIG. 2 is a diagram schematically depicting placement of MTC-IWF proxy between MTC-IWF and SCS.

FIG. 1 illustrates that the IPX service network further hosts an Identity Mapping function 34 in a bidirectional communication with MTC-IWF Proxy 32. Identity Mapping function 34 is a database that stores the mapping between the IMSI as used by MNOs 12 and External Identifier as used by MTC/M2M service providers 14. FIG. 2 illustrates that Identity Mapping function 34 provides translation between IMSI and External-Identifiers.

MTC-IWF Proxy 32 supports all commands from the "Tsp" (Trigger—service provider) interface, including but not limited to "Device-Action-Request/Device-Action-Answer" (DAR/DAA) and "Device-Notification-Request/Device-Notification-Answer" (DNR/DNA) commands. MTC-IWF Proxy 32 further provides "Identifier Translation" (external to internal identifier) at the ingress of the PMN (this is only if the MTC-IWF 18 cannot accommodate the ID translation itself). MTC-IWF Proxy 32 supports call detail record (CDR) generation for billing purposes. Finally, MTC-IWF Proxy 32 utilizes "Domain Selection Procedures" in order to select an appropriate MTC-IWF 18 to communicate with MTC-IWF Proxy 32.

MTC-IWF Proxy 32 is based on the same platform as the exiting IPX Sha Diameter protocol. The Tsp interface is based on the Diameter protocol and is used by service providers 14 to make trigger requests. Tsp is a 3GPP standardized interface to facilitate value-added services motivated by service providers 14 (e.g., control plane device triggering) and provided by SCS 30. Tsp is an open interface that allows MTC-IWF Proxy 32 to connect to one or more SCSs 30 and receive the device trigger request from SCS 30. Domain selection procedures may be used in order to select the appropriate MTC-IWF 18 to send the request. The MTC architecture for device triggering with the interface Tsp between SCS 30 and 3GPP network. Tsp is used by SCS 30 to send a trigger request to MNO 12 using the External Identifier to identify the target device. Tsp is based on the Diameter protocol and terminates at the MTC-IWF 18 within MNO 12.

Figure 3:
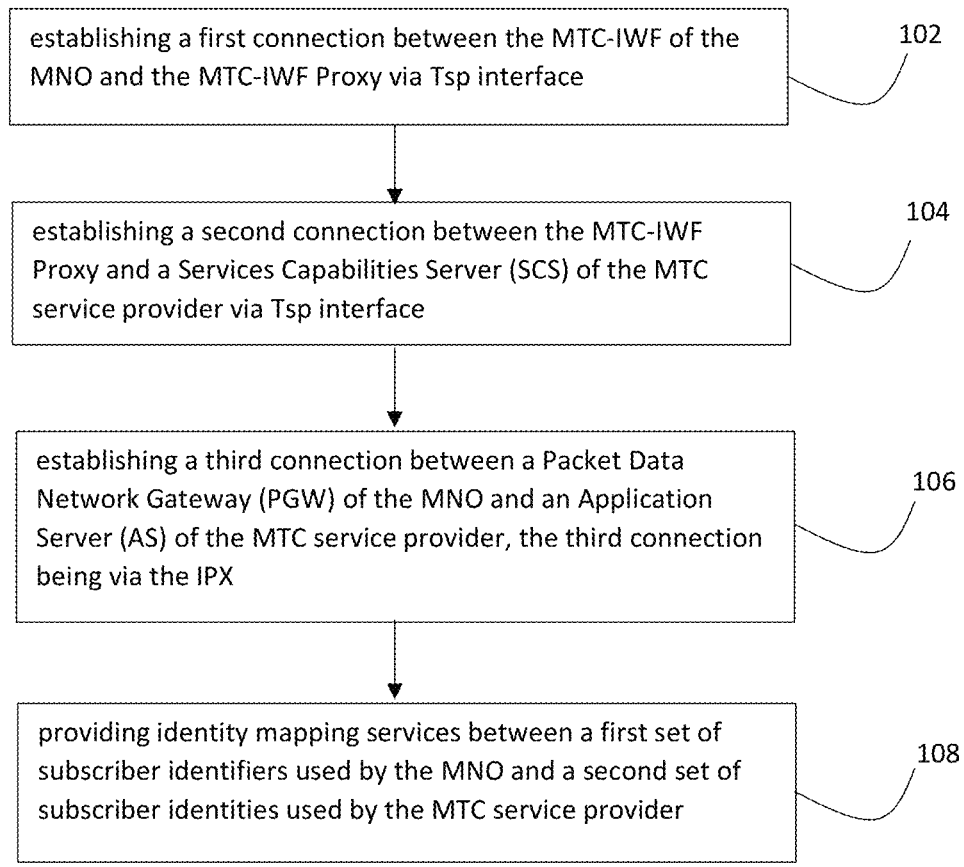
FIG. 3 is a flowchart illustrating a method of establishing a connection between an MNO and an MTC service provider.

FIG. 3 is a flowchart illustrating the method of using MTC-IWF Proxy to enable MTC service provider 14 to connect to MNO 12. In step 102, a first connection is established between MTC-IWF 18 of MNO 12 and the MTC-IWF Proxy 32 via Tsp interface. In step 104, a second connection is established between MTC-IWF Proxy 32 and SCS 30 via Tsp interface. In step 106, a third connection is established between PGW 26 of MNO 12 and AS 28 of MTC service provider 14 via the IPX 16. In step 108, identity mapping services are provided between a first set of subscriber identities used by MNO 12 and a second set of subscriber identities used by MTC service provider 14, thereby enabling MNO 12 and the MTC service provider 14 to communicate with one another without modifying their internal signaling protocols.

The following are some of the advantages of the present invention: (1) single connection to multiple service providers on the 3GPP Tsp interface; (2) ease of on-boarding of new service provider partners; (3) network topology hiding; (4) security; and (5) single subscription identity.

Control Plane Reference Points

Tsp: Reference point used by SCS 30 and SCEF 38 to communicate with the MTC-IWF 18 related CP signalling. Supports the device trigger functionality, including reception of a device trigger request from SCS 30 that includes an Application Port ID used by UE 50 to route the trigger internally to the appropriate triggering function.

S6m: Reference point used by MTC-IWF 18 to interrogate HSS/HLR 20. Support interrogation of HSS/HLR 20 to:
1) Map MSISDN or external identifier to IMSI.
2) Retrieve serving node information for the UE 50 (i.e. Serving MME/SGSN 22 and IP-SM-GW24 identities).
3) Determine if SCS 30 is allowed to send a device trigger to UE 50.

S6n: Reference point used by MTC-AAA to interrogate HSS/HLR 20.

T6a: Reference point used between SCEF 38 and serving MME.

T6b: Reference point used between SCEF 38 and serving SGSN.

The T6a and T6b reference points fulfil the following requirements:
1) T6a connects the SCEF 38 to the serving MME.
2) T6b connects the SCEF 38 to the serving SGSN.
3) Supports the following functionality:
   a. Monitoring event configuration by the SCEF 38 at the serving MME/SGSN 22.
   b. Monitoring event reporting by the serving MME/SGSN 22 to the SCEF 38.
   c. NIDD to/from the serving MME/SGSN 22.

S6t: Reference point used between SCEF 38 and HSS 20. The S6t reference point shall fulfil the following requirements:
1) Connect the SCEF 38 to HSS 20 containing subscription and UE-related information.
2) Monitoring event configuration/deletion by the SCEF 38 at HSS 20.
3) Monitoring event reporting by the HSS to the SCEF 38.
4) Configuration/deletion of communication pattern parameters by the SCEF 38 to HSS 20.

SGd: Diameter reference point used between the serving MME 22a and the SMSC 24.

User/Data Plane Reference Points

API: External reference point between the SCEF 38 and SCS 30.

Gi/SGi: The reference point between the PGW 26 and the packet data network. The packet data network may be an operator external public or private packet data network or an intra operator packet data network, e.g. for provision of IMS services. This reference point corresponds to Gi for 3GPP accesses.

Service Capability Exposure Function (SCEF) Proxy

Figure 4A:
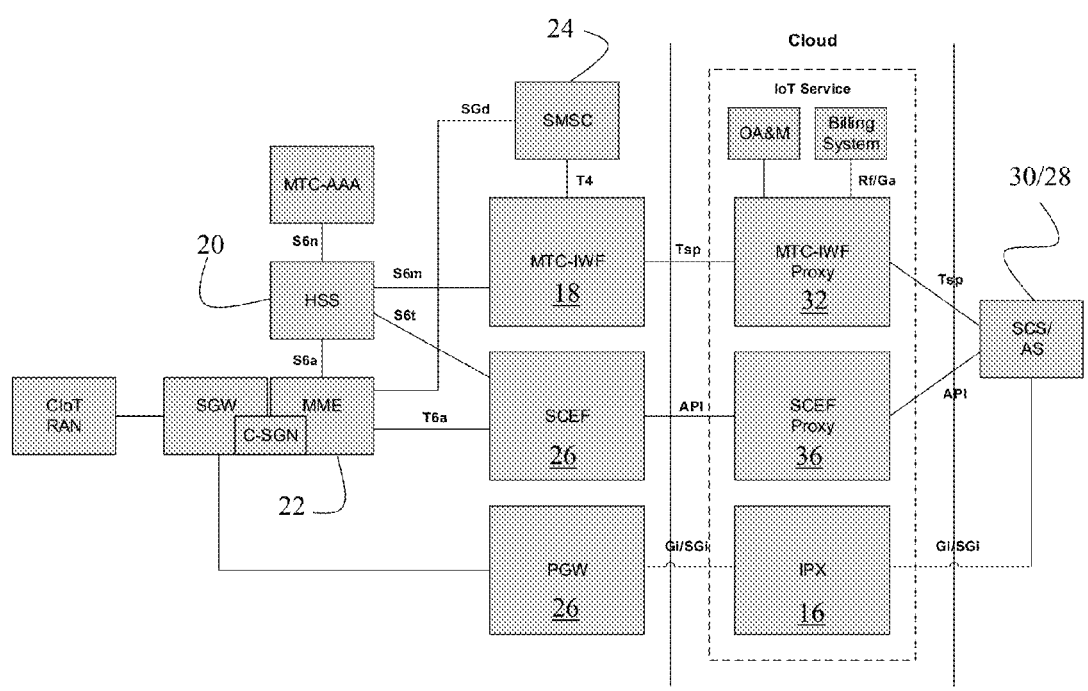
FIG. 4A is a diagram schematically depicting components of a network system according to the present invention in which MTC-IWF Proxy facilitates connection between MNO and an MTC service provider.
Figure 4B:
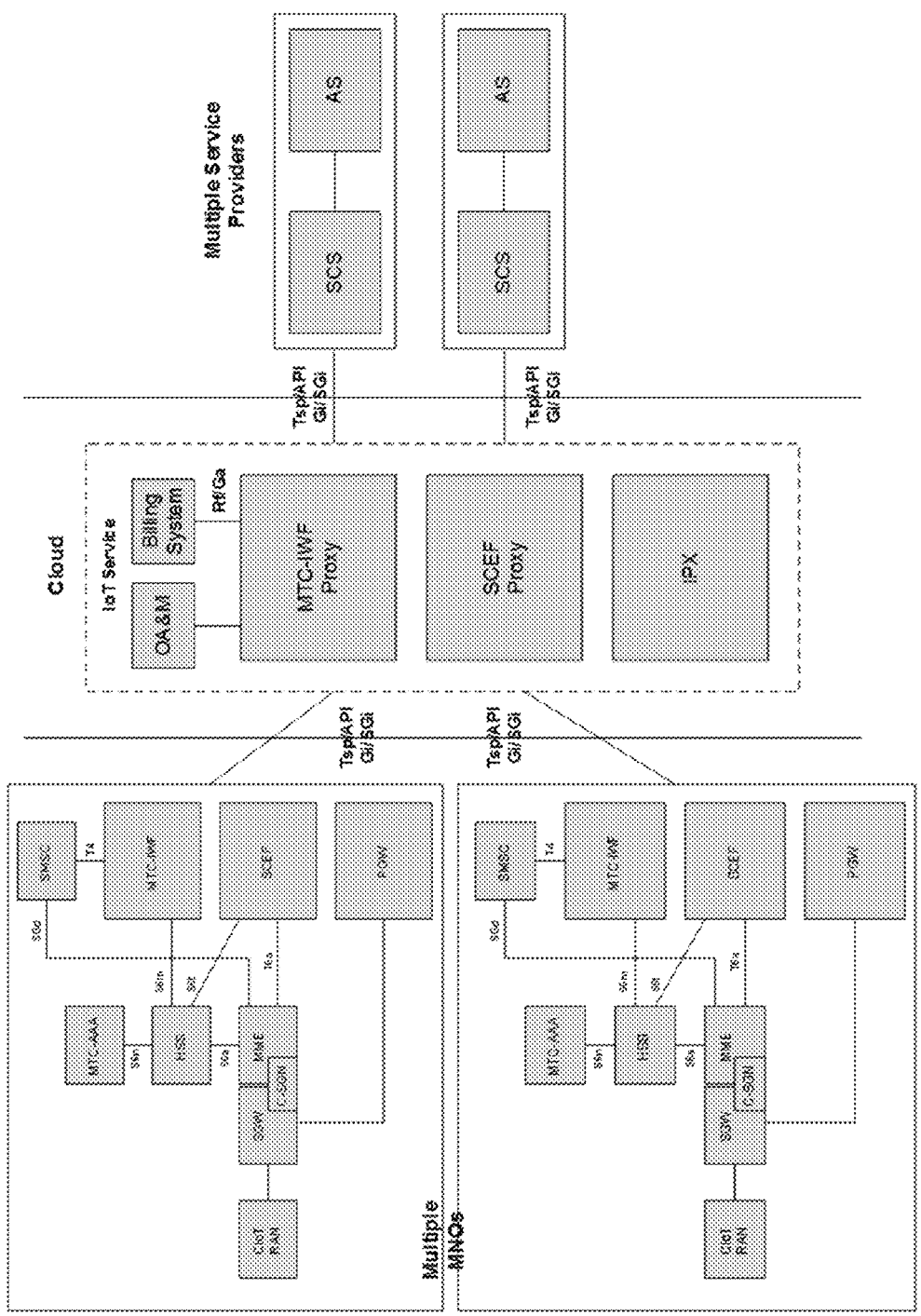
FIG. 4B is a diagram schematically depicting components of a network system according to the present invention in which MTC-IWF Proxy facilitates connection between multiple MNOs and an MTC service provider.

In an embodiment depicted in FIG. 4A, the MTC-IWF Proxy 32 works in conjunction with SCEF Proxy 36. SCEF Proxy 36 resides on IPX 16 and can be co-located with the MTC-IWF Proxy 32. SCEF Proxy 36 interfaces via application programming interfaces (APIs) with SCS 30 of the service provider and also with SCEF 38 of the MNO 12. SCEF Proxy 36 enables the service provider to expose its services and capabilities via 3GPP interfaces. FIG. 4B depicts an embodiment of the invention involving multiple MNOs 12.

Figure 5:
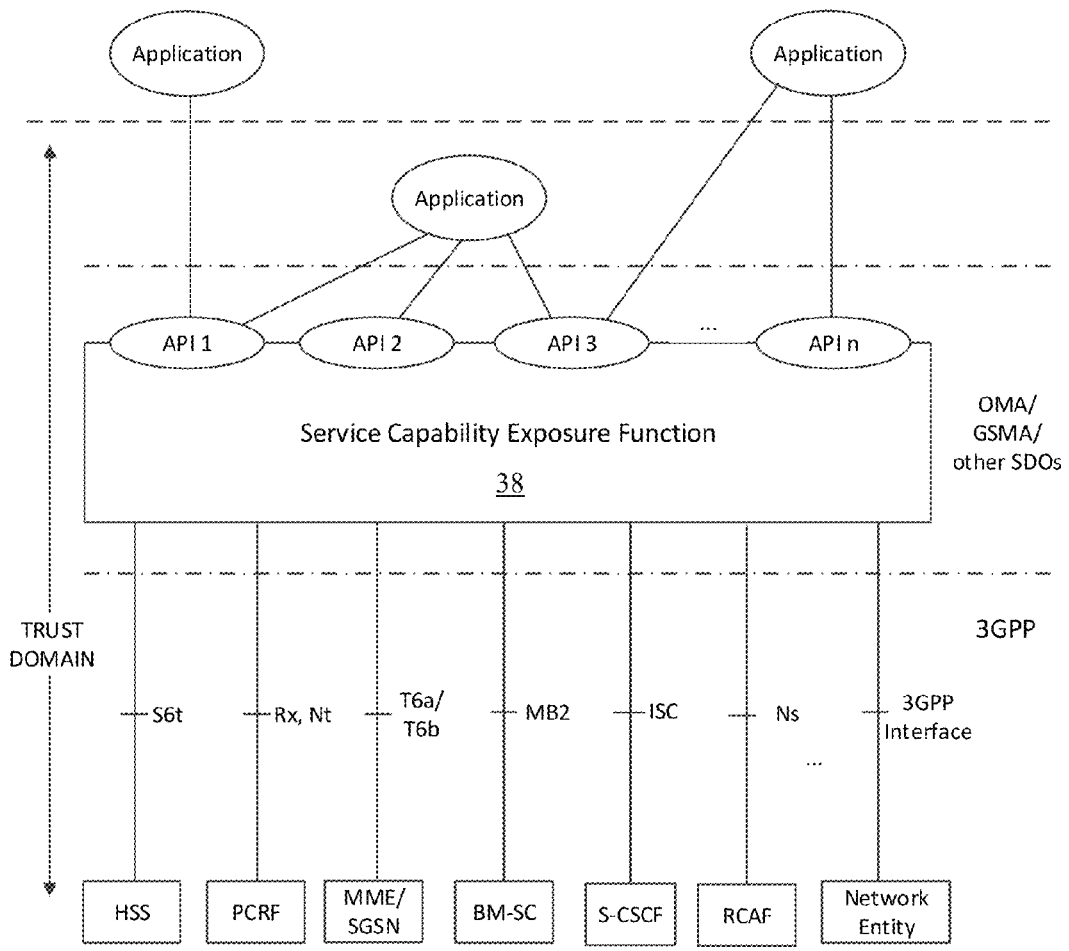
FIG. 5 is a diagram schematically depicting a SCEF facilitating connections between Applications and 3GPP network components.

FIG. 5 schematically depicts SCEF 38 enabling the 3GPP network to expose its services and capabilities provided by 3GPP network interfaces to external 3rd party service provider applications. Multiple Applications connect to SCEF 38 via various APIs. SCEF 38 interfaces with various network components as illustrated in FIG. 5. A security concern arises when Applications outside of trust domain connect to SCEF 38. The present invention addresses this issue by providing SCEF Proxy 36 that interfaces with SCEF 38 of MNO 12 and SCS 30 of the Service Provider 14.

SCEF Proxy 36 is capable of performing multiple functions. First, SCEF Proxy 36 supports mutual authentication with the 3GPP Network Entity. Second, SCEF Proxy 36 uses integrity protection, replay protection, and confidentiality protection. Third, SCEF Proxy 36 provides privacy of the 3GPP user (e.g. IMSI/IMPI is not sent outside the 3GPP operator's domain). Fourth, the 3GPP Network Entity is able to determine whether SCEF Proxy 36 is authorized to send requests to the 3GPP Network Entity. Fifth, SCEF Proxy 36 enables the 3GPP Network Entity to determine whether authorization shall be per UE 50, or optionally per service per UE 50 (the method of achieving authorization per UE or per service per UE is specific to application and network configuration). SCEF Proxy 36 abstracts all services from the underlying 3GPP network interfaces and protocols. SCEF Proxy 36 enables external entities to discover the exposed service capabilities.

In an embodiment, SCEF Proxy 36 has an "authentication and authorization" functionalities, which include the following: identification of the API consumer, profile management, and Access Control List management.

In an embodiment, SCEF Proxy 36 also has a "Policy Enforcement" functionalities, which include the enforcement of Infrastructural Policy, Business Policy, and Application Layer Policy. Infrastructural Policy refers policies to protect platforms and network, an example of which is ensuring that a service node such as SMS-SC is not overloaded. Business Policy refers to policies related to the specific functionalities exposed. Examples of Business Policy are number portability, service routing, subscriber consent etc. Application Layer Policy refers to policies that are primarily focused on message payload or throughput provided by an application—an example is throttling.

Figure 6:
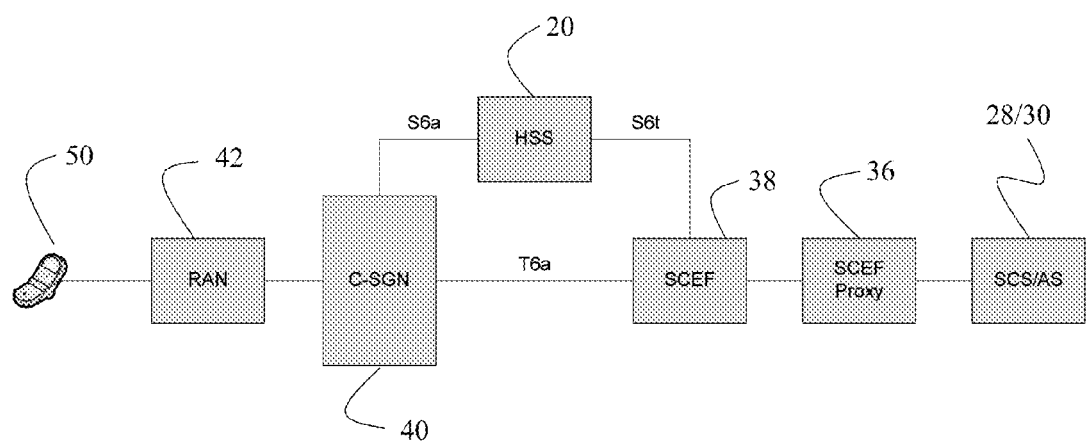
FIG. 6 is a diagram depicting a configuration in which SCEF Proxy facilitates non-SMSC data transmissions.

Furthermore, in an embodiment, SCEF Proxy 36 facilitates non-SMSC transmissions as depicted in FIG. 6. UE 50 communicates with RAN 42, which, in turn, communicates with C-SGN 40. C-SGN 40 communicates with SCEF 38 via T6a. HSS 20 communicates with C-SGN 40 via Sha and with SCEF 38 via S6t. SCEF 38 communicates with SCEF Proxy 36, which is ultimately communicates with SCS 30/AS 28.

Figure 7:
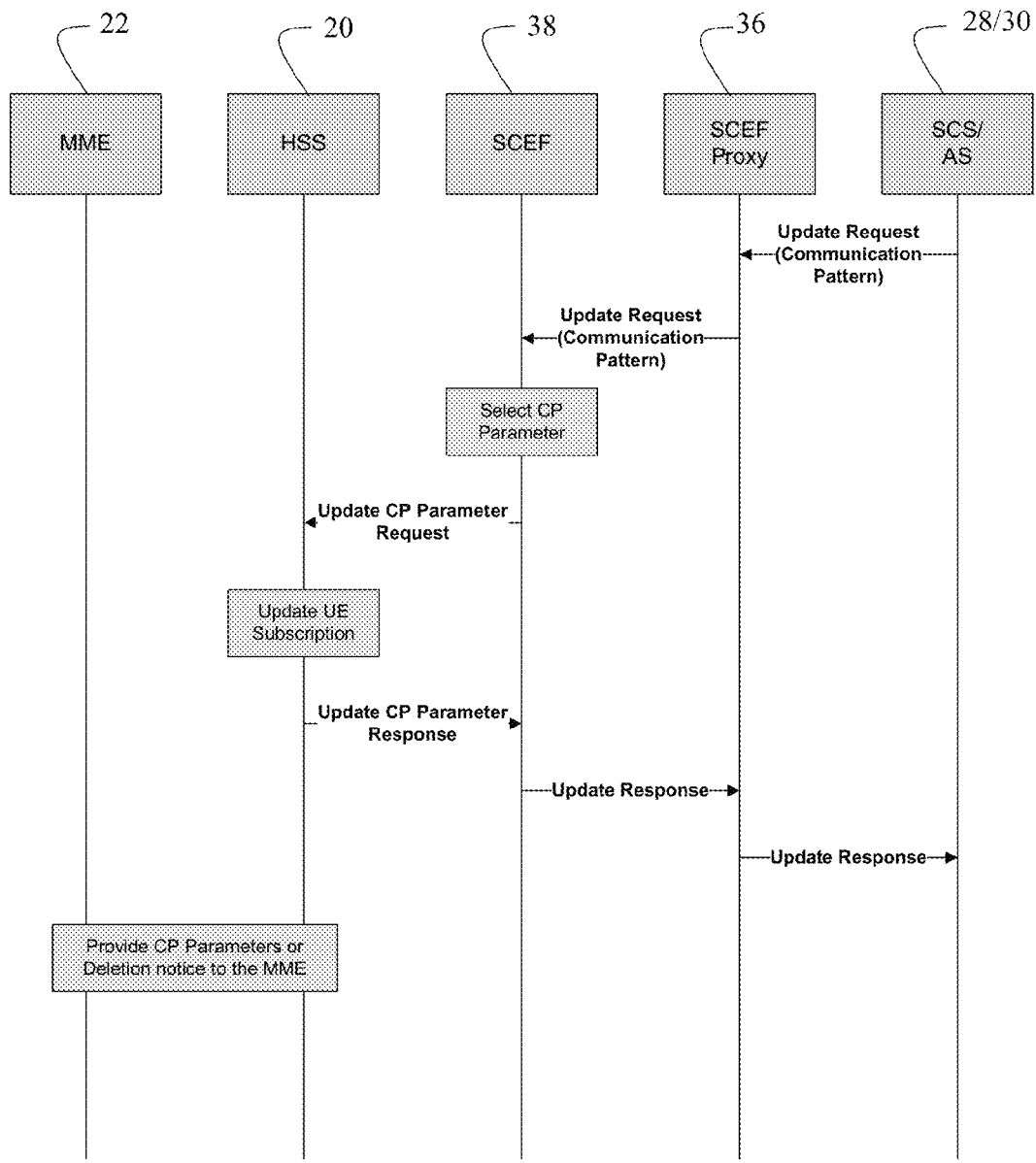
FIG. 7 is a data flow diagram for communication pattern (CP) provisioning to the MME.

Provisioning and parameter setting capability of SCEF Proxy 36 is illustrated in FIG. 7. FIG. 7 depicts data flow for communication pattern (CP) parameters provisioning to MME 22. SCS 30/AS 28 sends an update request to SCEF Proxy 36, which sends it to SCEF 38. SCEF 38 selects CP parameters and sends an update CD parameter request to HSS 20. HSS 20 updates UE 50 subscription and returns an update CP parameter response to SCEF 38. SCEF 38 sends an update response to SCEF Proxy 36, which sends it to SCS 30/AS 28. HSS 20 provides CP parameters to MME 22.

SCEF Proxy 36 functionality interworks with the following processes: HSS 20, MME/SGSN 22, and PCRF 46. SCEF Proxy 36 protects the PLMN entities (i.e., HSS 20 and MME/SGSN 22) from requests exceeding the permission arranged in the SLA with the third-party service provider. Some of these components are discussed in more detail below.

Event Configuration

Figure 8:
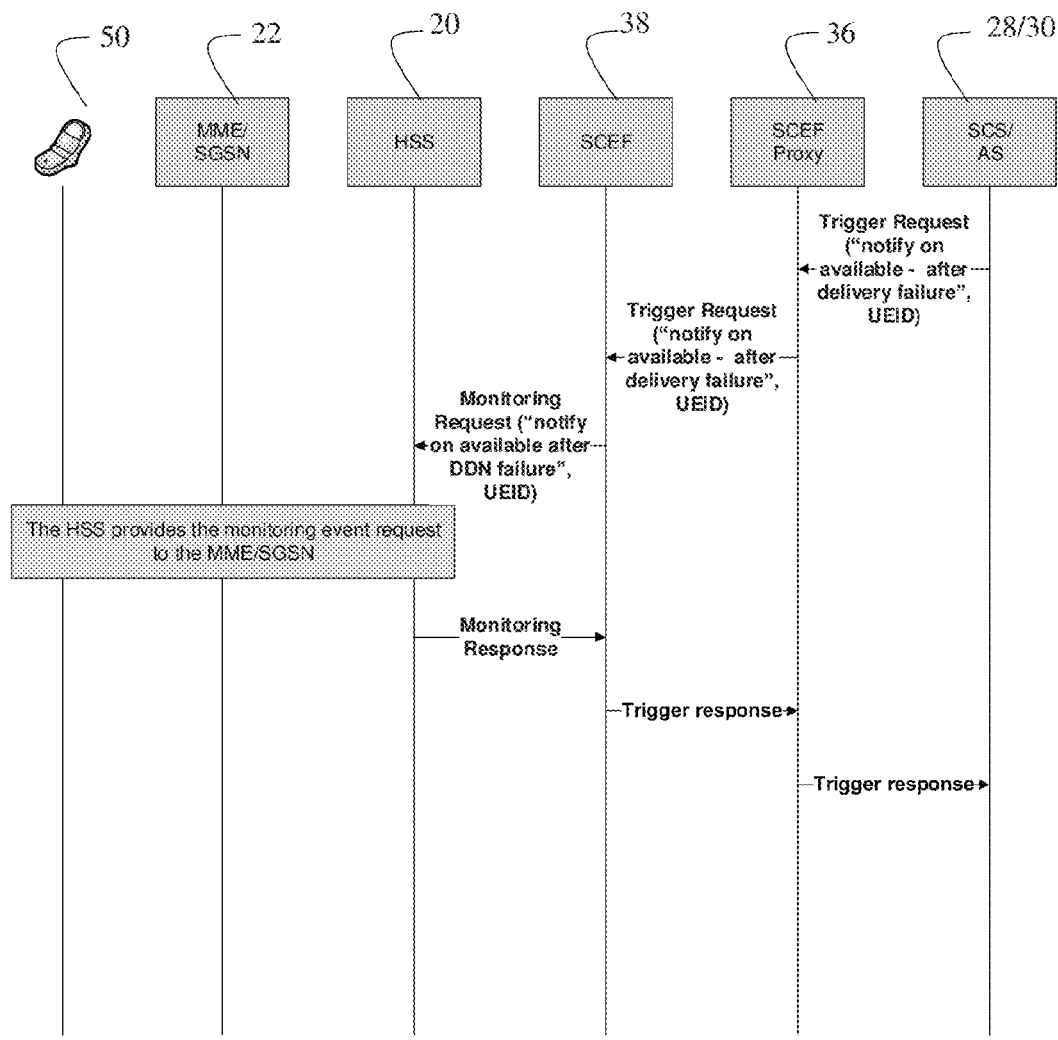
FIG. 8 is a data flow diagram depicting a procedure for Event Configuration—Availability Notifications after DDN failure.

FIG. 8 depicts signal flow for event configuration after delivery failure. SCS 30/AS 28 sends a trigger request ("notify on available after delivery failure," UE ID) message to SCEF Proxy 36, which sends this massage to SCEF 38. SCEF 38 sends a monitoring request ("notify on available after DDN failure," UE ID) to HSS 20. HSS 20 provides the monitoring event request to the MME/SGSN 22 and sends a monitoring response back to SCEF 38. SCEF 38 sends a trigger response to SCEF Proxy 36, which sends it to SCS 30/AS 28.

Connection Management

Figure 9A:
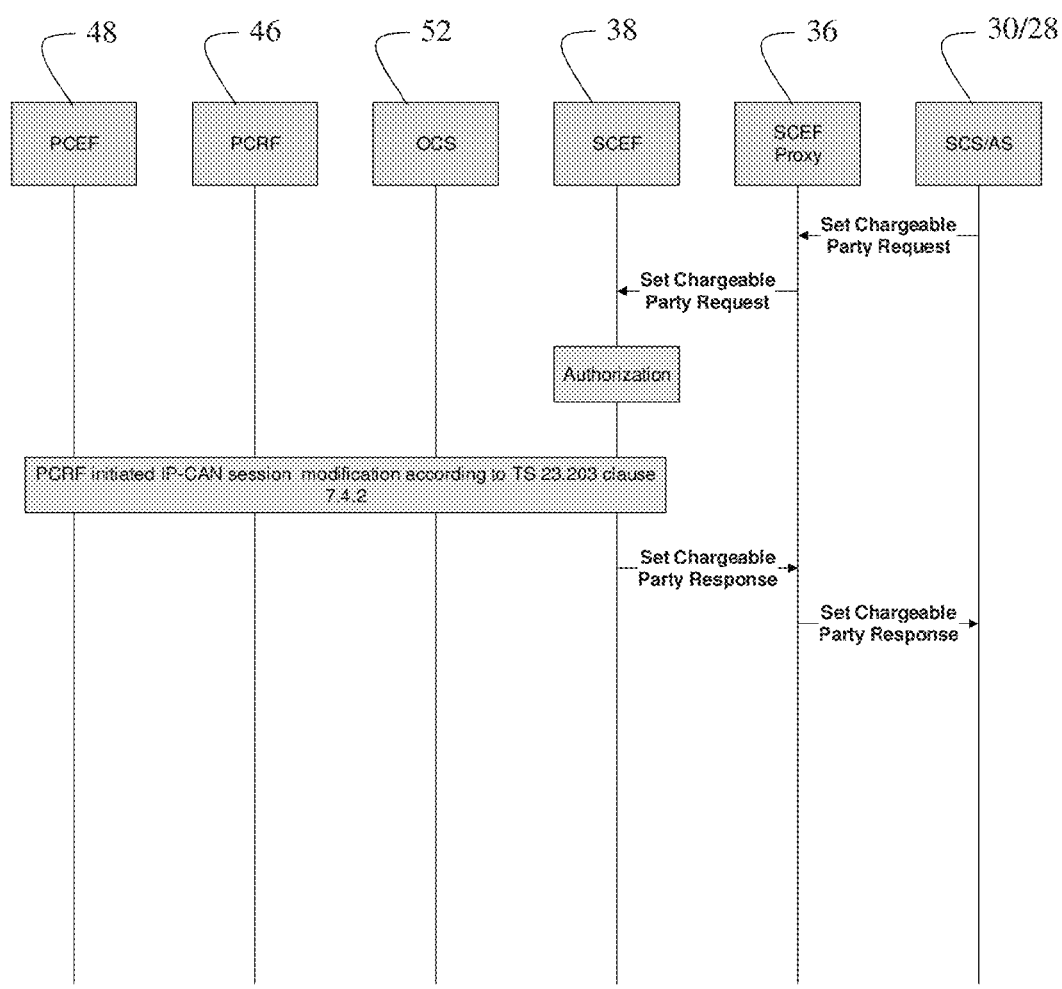
FIG. 9A is a data flow diagram for setting a chargeable party at AS-session setup.

FIG. 9A depicts signal flow for setting the chargeable party at AS-session setup. The SCS 30/AS 28 may either request to sponsor the traffic from the beginning or may become the chargeable party at a later point. SCS 30/AS 28 sends Set Chargeable Party request to SCEF Proxy 36, which sends it to SCEF 38. SCEF 38 performs authorization. PCRF-initiated IP-CAN session modification is established via PCEF 48, PCRF 46, OCS 52 and SCEF 38. SCEF 38 sends a Set Chargeable Party response to SCEF Proxy 36, which sends it to SCS 30/AS 28.

Figure 9B:
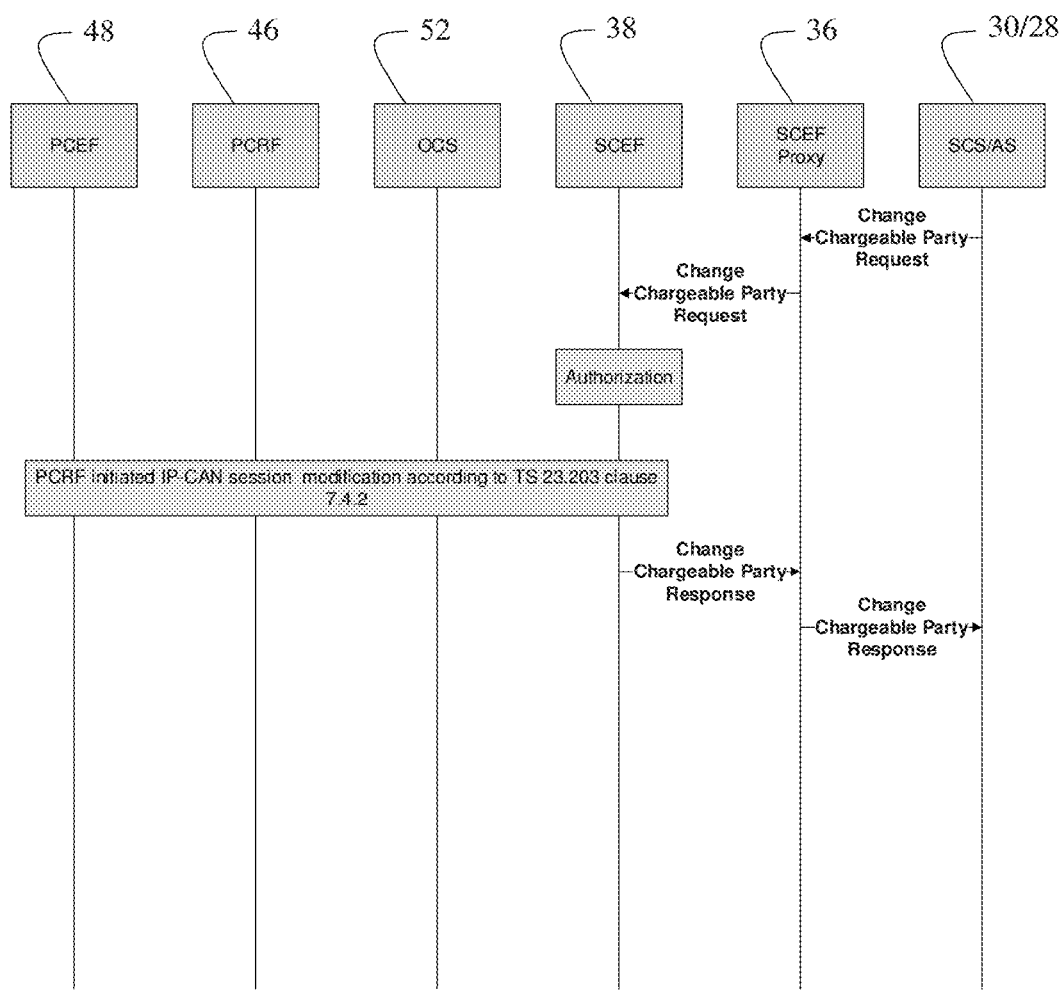
FIG. 9B is a data flow diagram for setting a chargeable party during an ongoing AS-session.

FIG. 9B depicts signal flow for changing the chargeable party during an ongoing AS session, in which the SCS 30/AS 28 is starting or stopping to sponsor the application traffic. The signal flow is similar to that depicted in FIG. 9A and described above, except that instead of sending a set chargeable party request and receiving a set chargeable party response, SCS 30/AS 28 sends a change chargeable party request and receives a change chargeable party response.

Identity Mapping and Addressing

In an embodiment, SCEF Proxy 36 supports mapping between information exchanged with SCS 30/AS 28 and information exchanged with internal PLMN functions. This mapping is provided by SCEF Proxy 36 using local configuration data.

SCEF Proxy 36 provides identity mapping and addressing. Identity mapping resides within communication between an HSS 20 and an SCEF 38. HSS 20 provides a mapping of the Mobile Subscriber Integrated Services Digital Network Number (MSISDN) external identifier to an International Mobile Subscriber Identity (IMSI). SCEF Proxy 36 relays the mapping identity from the SCEF 38 to the SC S/AS.

There is identity mapping within SCEF 38 for "Group Message Delivery." Per the "TMGI Allocation Procedure" (specified in TS 23.468), SCEF 38 will send the received TMGI and expiration time information to the external SCS 30/AS 28. In this scenario, SCEF Proxy 36 caches the serving BM-SC Identity information and mapping between External Group ID and TMGI. The "breakout" of the group message ID is already completed before the message is sent onto SCEF Proxy 36. SCEF Proxy 36 then relays the broken-out group IDs to the SCS 30/AS 28. SCEF Proxy uses a database (or a set of functional tables) to handle these mapping services.

Billing and Charging

The support of accounting functionality for Monitoring Events and Non-IP Data Delivery (NIDD) via SCEF Proxy 36 is optional. Depending on operator configuration of SCEF Proxy 36 support accounting functionality for Monitoring Events and/or NIDD.

With respect to Monitoring Events, accounting information is generated for every Monitoring Event configuration request, Monitoring Event modification request, and implicit or explicit Monitoring Event deletion request. The accounting information is also generated for Monitoring Event response messages. The requirement to generate Accounting information applies for messages which have been defined as part of the Monitoring function—i.e., Monitoring Request and Monitoring Indication. Accounting information, such as the number of successful Monitoring Requests, number of failed Monitoring Requests, number of Monitoring Event Reports generated due to a configured Monitoring Event, is collected by SCEF Proxy 36 for intra-operator use and for inter-operator settlements.

Figure 10:
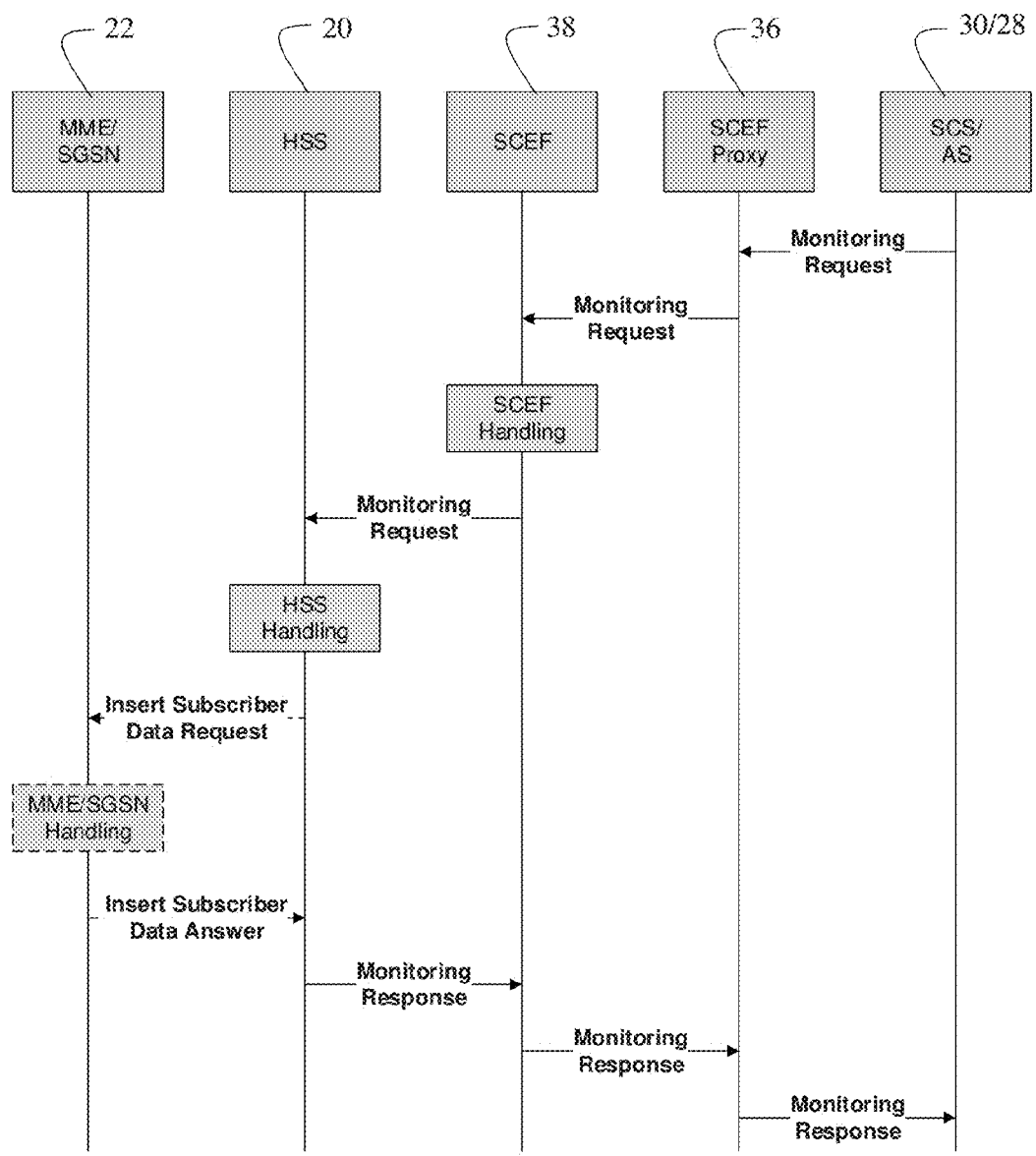
FIG. 10 is a data flow diagram for configuring monitoring events at the HSS.

FIG. 10 depicts the data flow for configuring monitoring at the HSS 20. SCEF Proxy 36 receives a Monitoring Request message from SCS 30/AS 28 and sends it to SCEF 38. The Monitoring Request message includes External Identifier or MSISDN, SCEF ID, SCEF Reference ID, Monitoring Type, Maximum Number of Reports, Monitoring Duration, SCEF Reference ID for Deletion, Chargeable Party Identifier.

Figure 11:
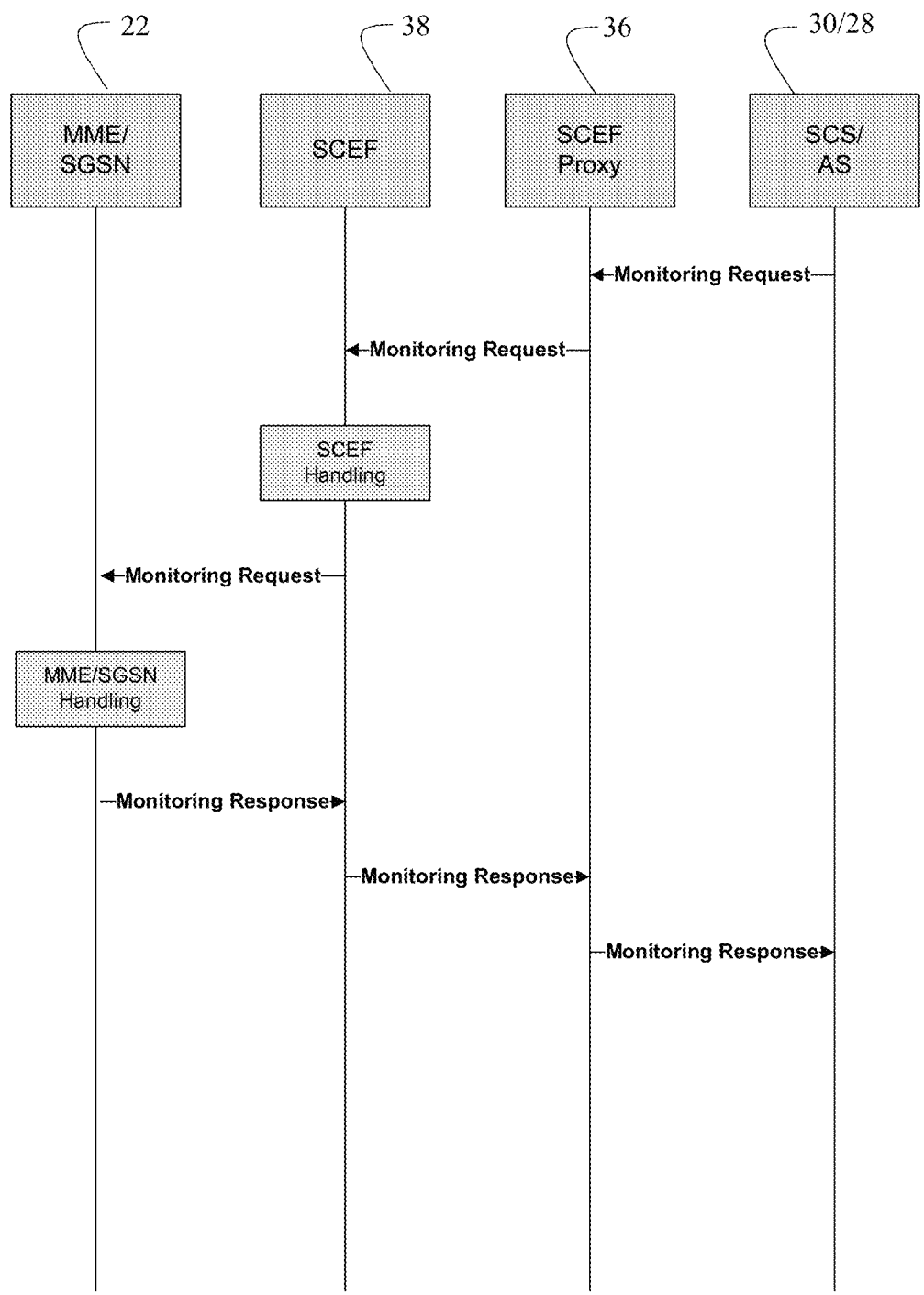
FIG. 11 is a data flow diagram for configuring monitoring at the MME/SGSN.
Figure 12:
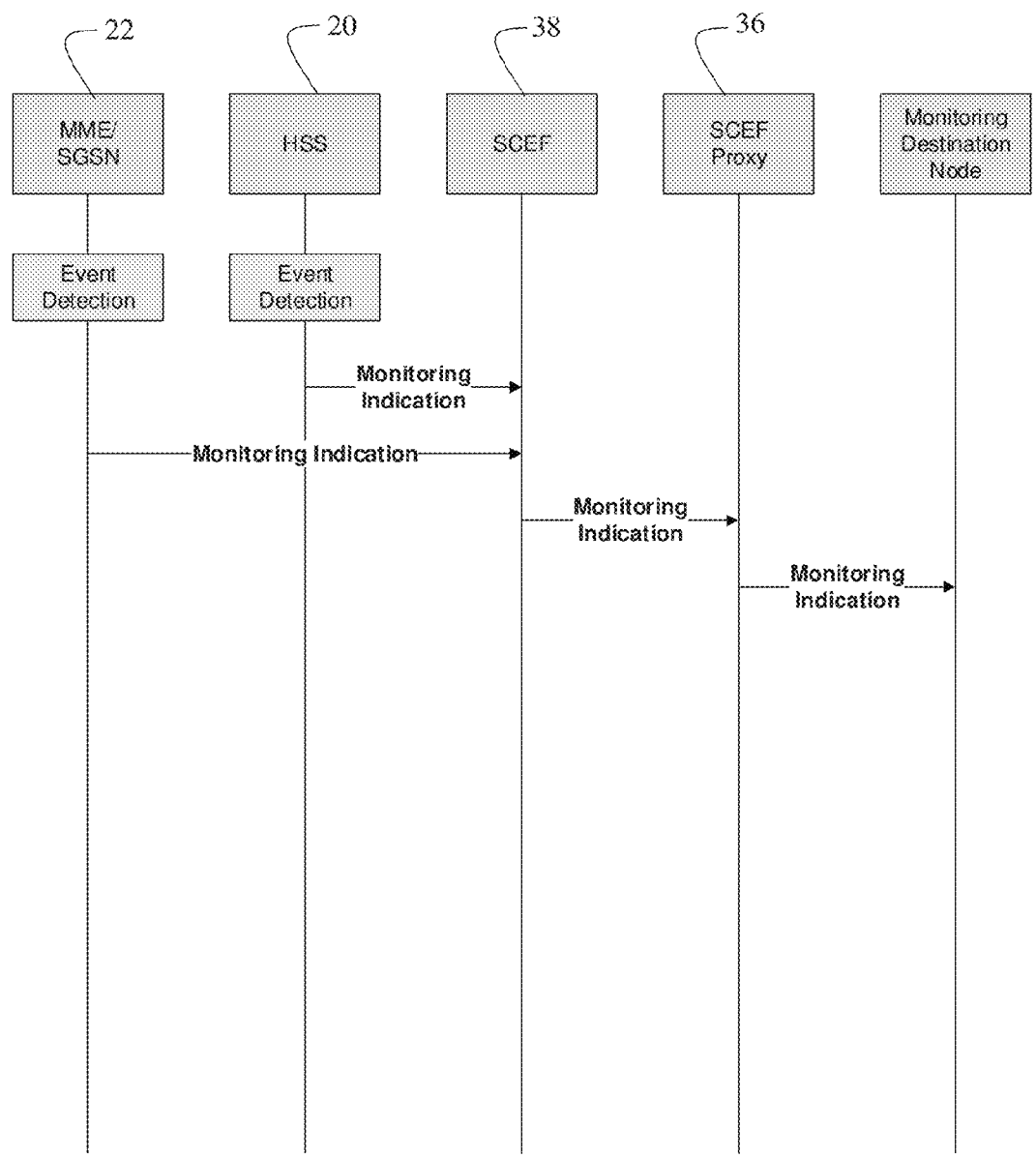
FIG. 12 is a data flow diagram for reporting Monitoring Events that are detected by MME/SGSN or HSS.
Figure 13:
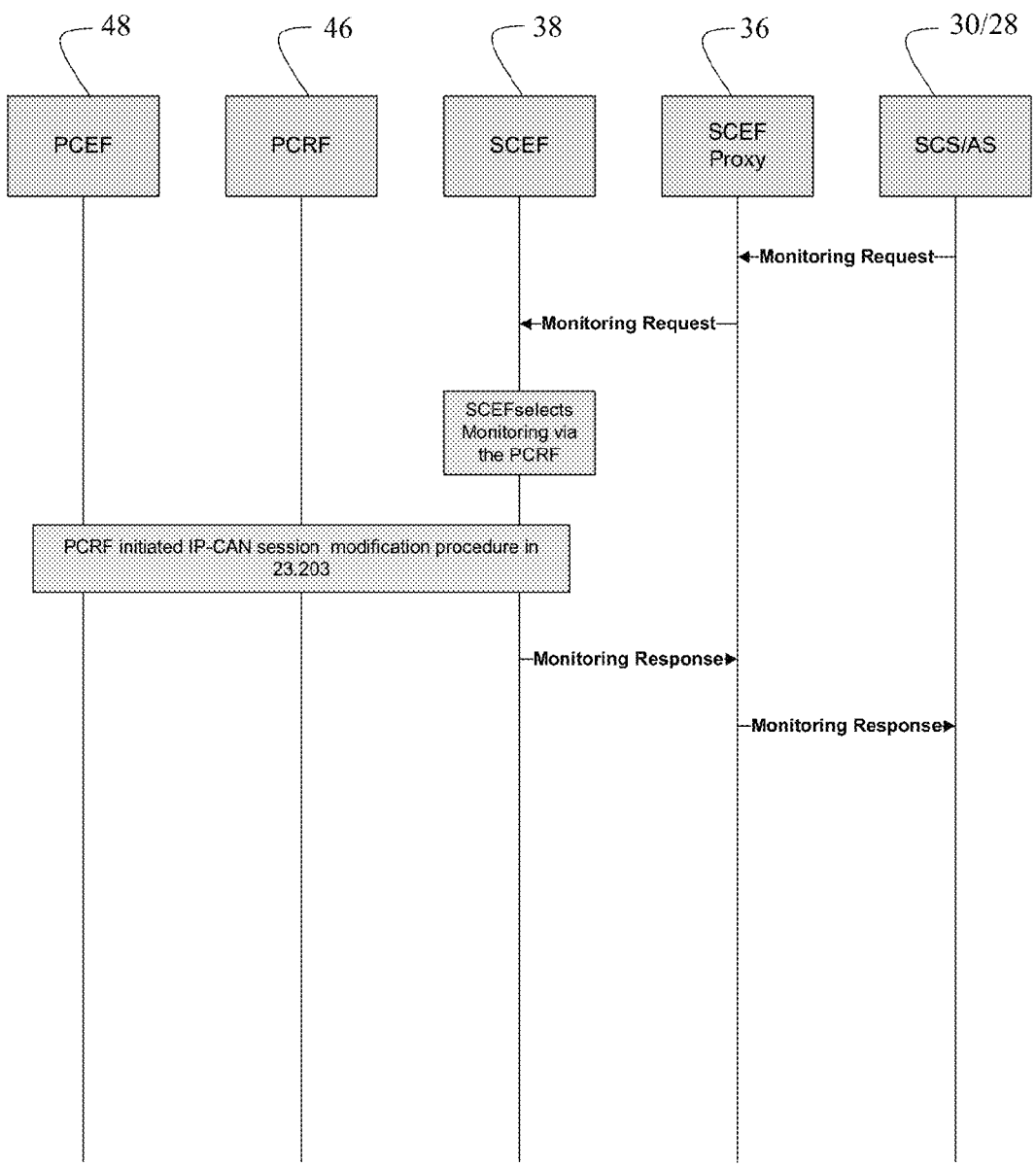
FIG. 13 is a data flow diagram for requesting Monitoring Events reporting via PCRF.
Figure 14:
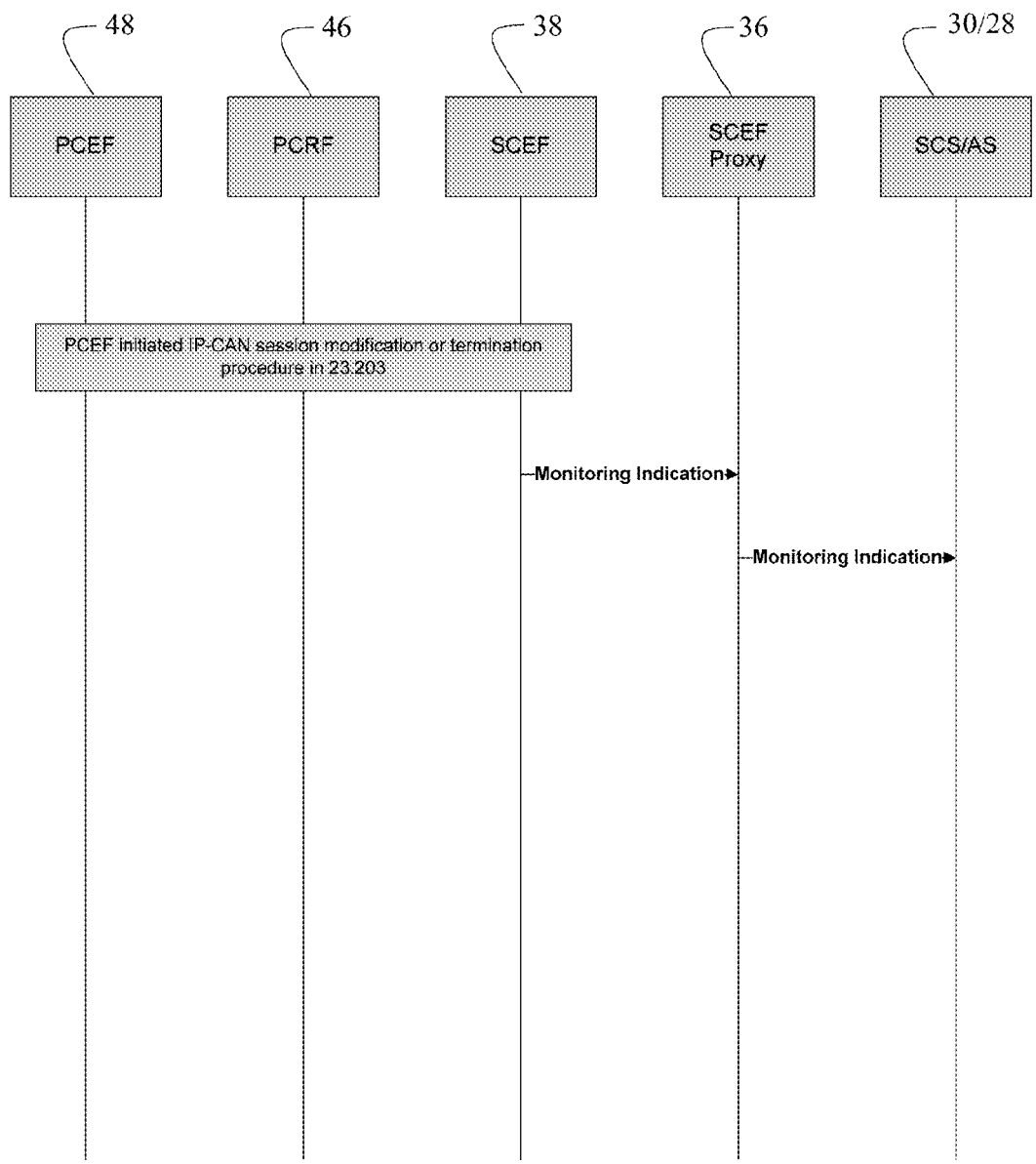
FIG. 14 is a data flow diagram for reporting Monitoring Events via PCRF.
Figure 15:
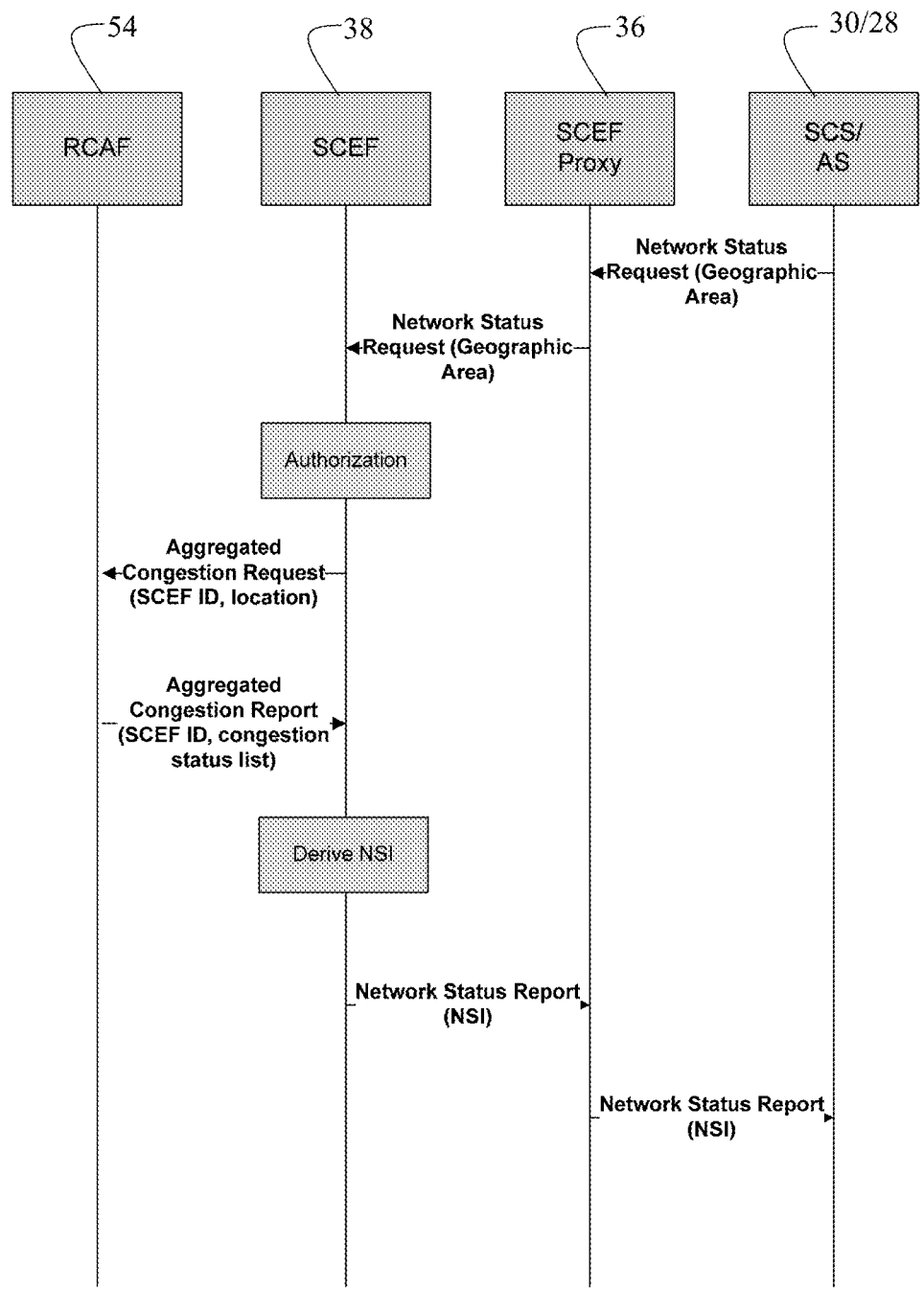
FIG. 15 is a data flow diagram for retrieving Network Status Information (NSI) from the network.
Figure 16:
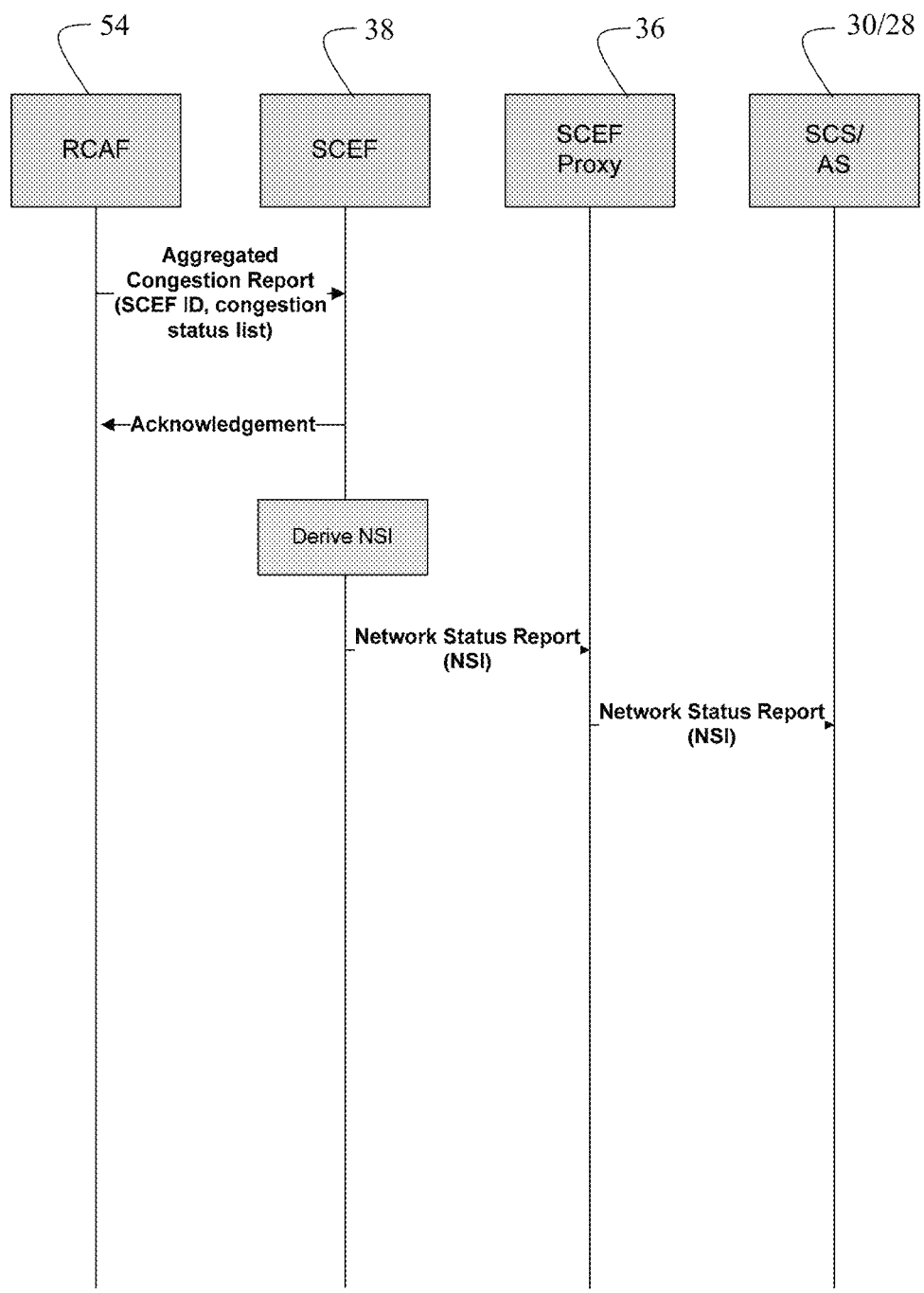
Figure 17:
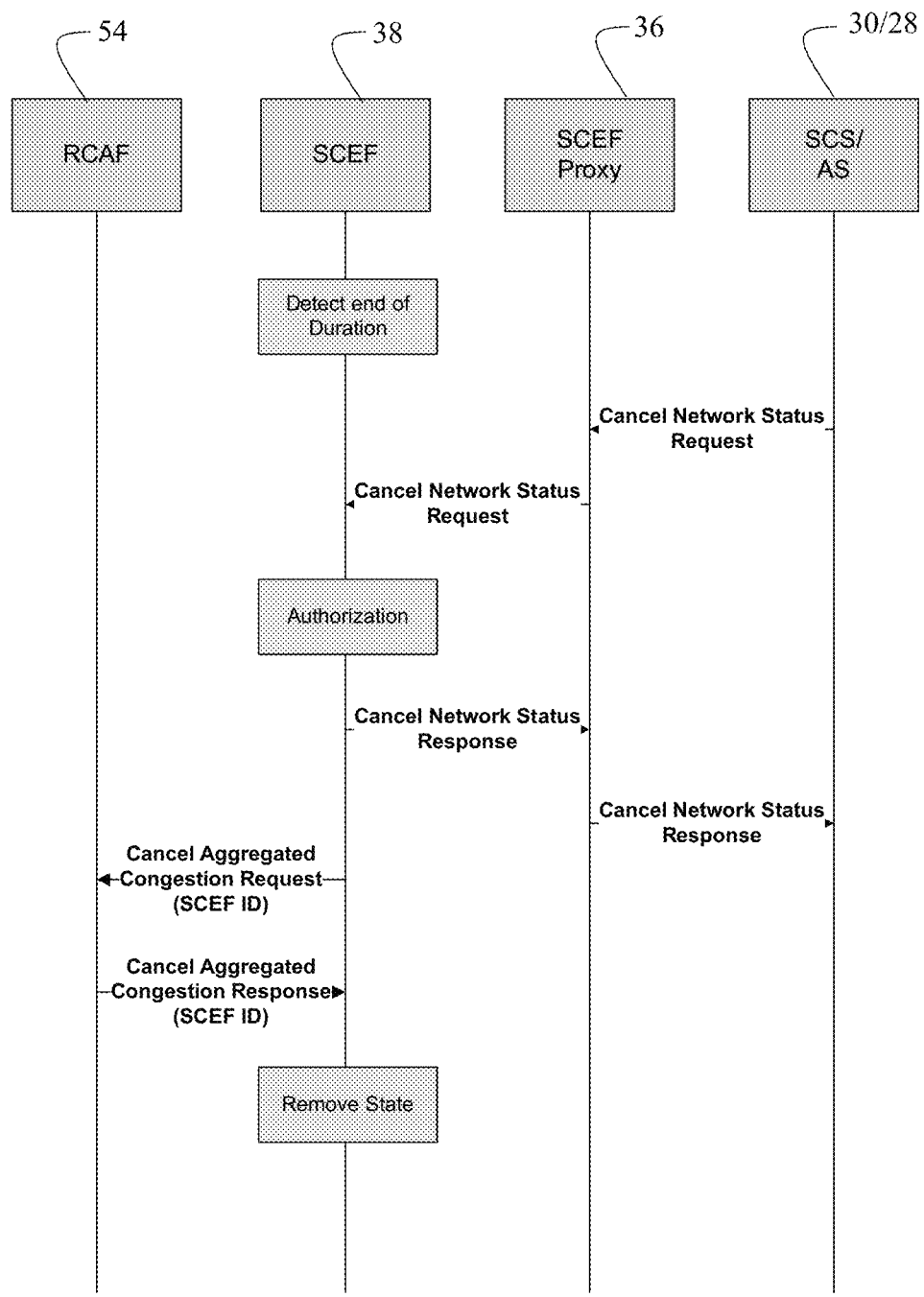
FIG. 17 is a data flow diagram for termination of the continuous reporting of network status.

FIGS. 11-17 are a series of data flow diagrams that illustrate various procedures related to Event Monitoring. FIG. 11 depicts data flow for the procedure of configuring monitoring at the MME/SGSN 22. FIG. 12 depicts data flow for the procedure of reporting Monitoring Events that are detected by MME/SGSN 22 or HSS 20. FIG. 13 depicts data flow for the procedure of requesting Monitoring Events reporting via PCRF 46. FIG. 14 depicts data flow for the procedure to report Monitoring Events via PCRF 46, which data flow is applicable to both user location information and communication failure. PCRF 46 subscribes to Access Network Information report. FIG. 15 depicts data flow for the procedure used by SCS 30/AS 28 to retrieve Network Status Information (NSI) from RCAF 54. This procedure can be used to request a one-time or continuous reporting network status. FIG. 16 depicts data flow for the procedure used by SCEF Proxy 36 to report a change of NSI to SCS 30/AS 28, when a continuous reporting of the network status is requested. Finally, FIG. 17 depicts data flow for the procedure used for termination of the continuous reporting of network status. It can be triggered by SCS 30/AS 28 at any time before the Duration is over or if no Duration was provided. SCEF Proxy 36 triggers this procedure when the Duration is over.

With respect to NIDD, accounting information is generated for every NIDD request and response message. Accounting information, such as the number of successful NIDD Submit Requests, number of failed NIDD Submit Requests, etc. is collected by SCEF Proxy 36 for intra-operator use and, also, for inter-operator settlements.

Figure 18:
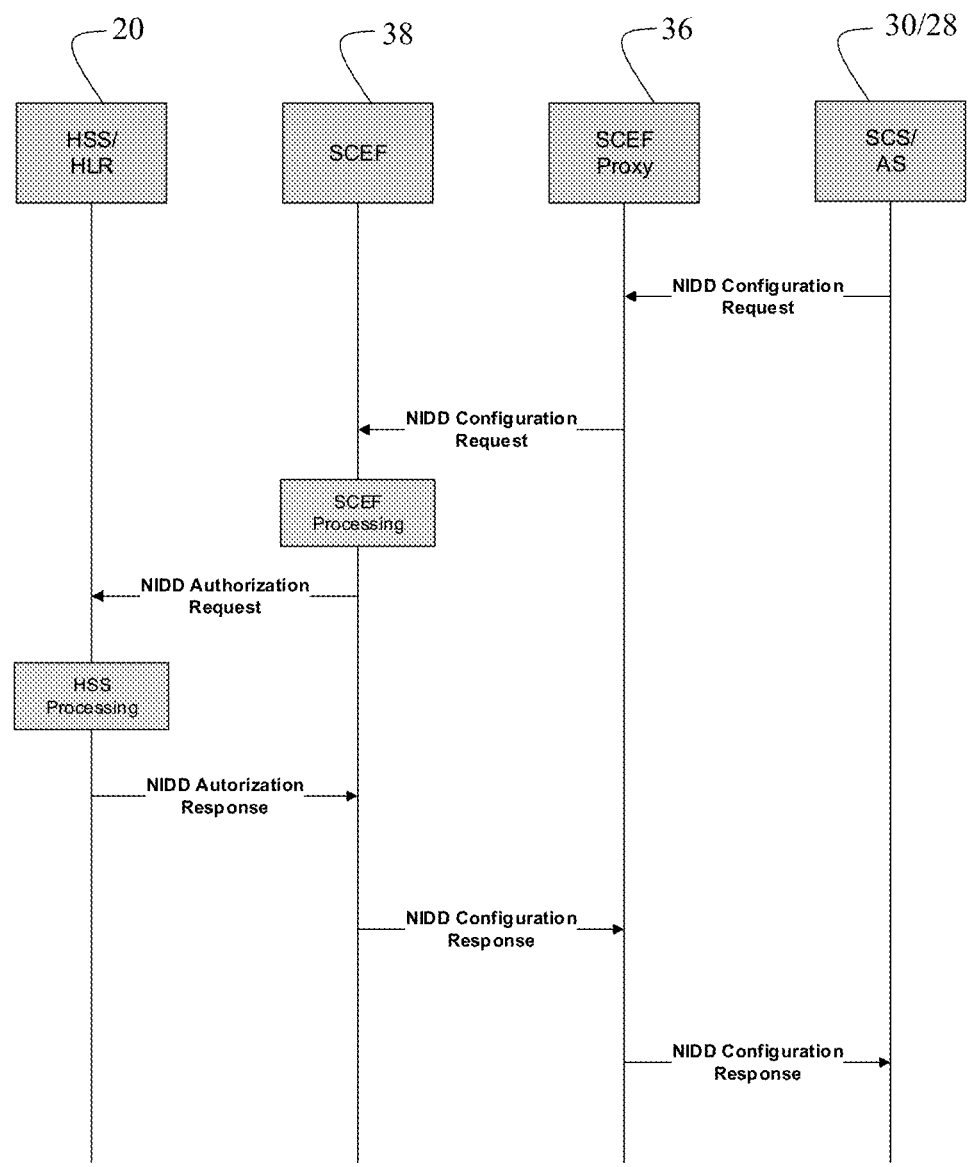
FIG. 18 is a data flow diagram for NIDD configuration procedure.
Figure 19:
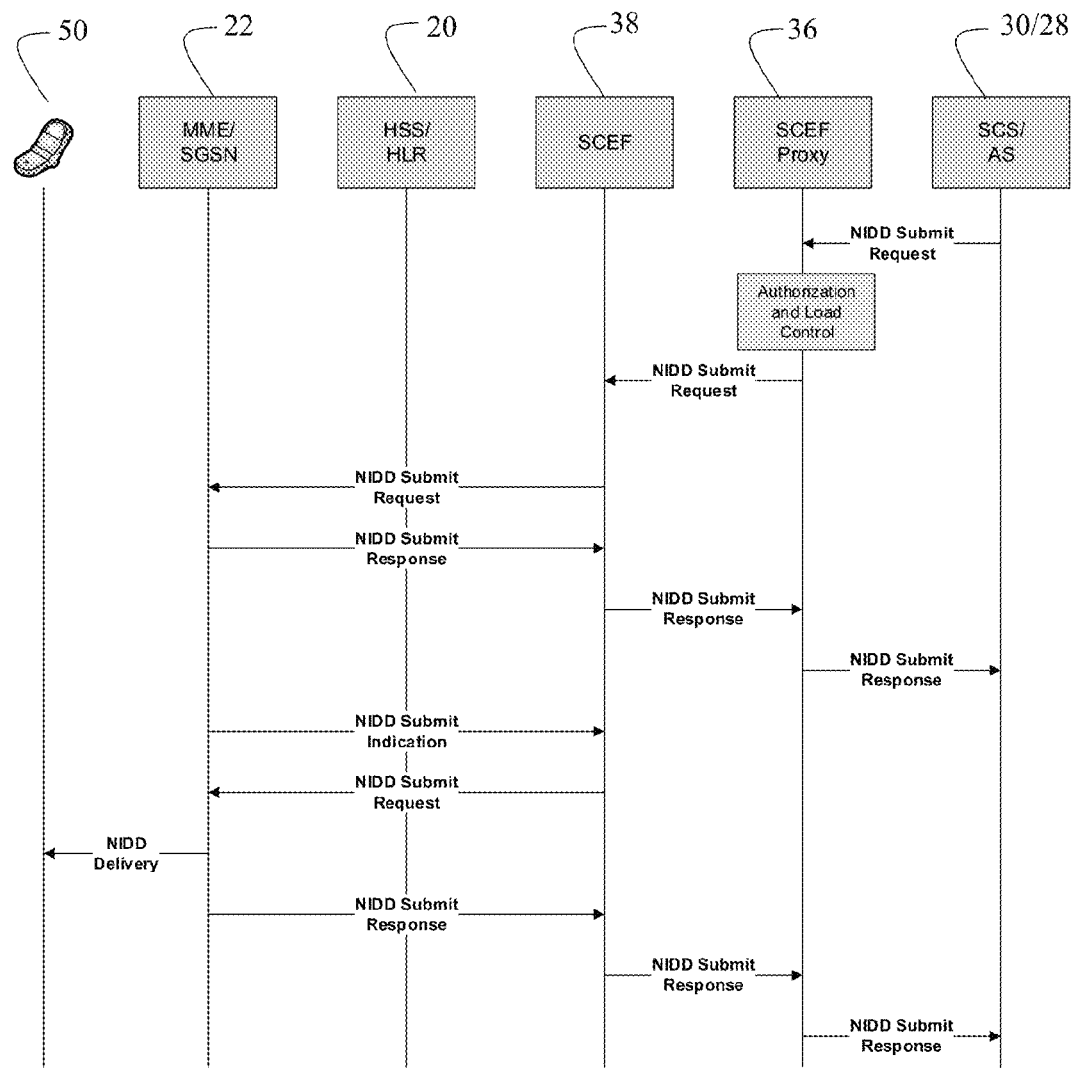
FIG. 19 is a data flow diagram for mobile terminated NIDD procedure.
Figure 20:
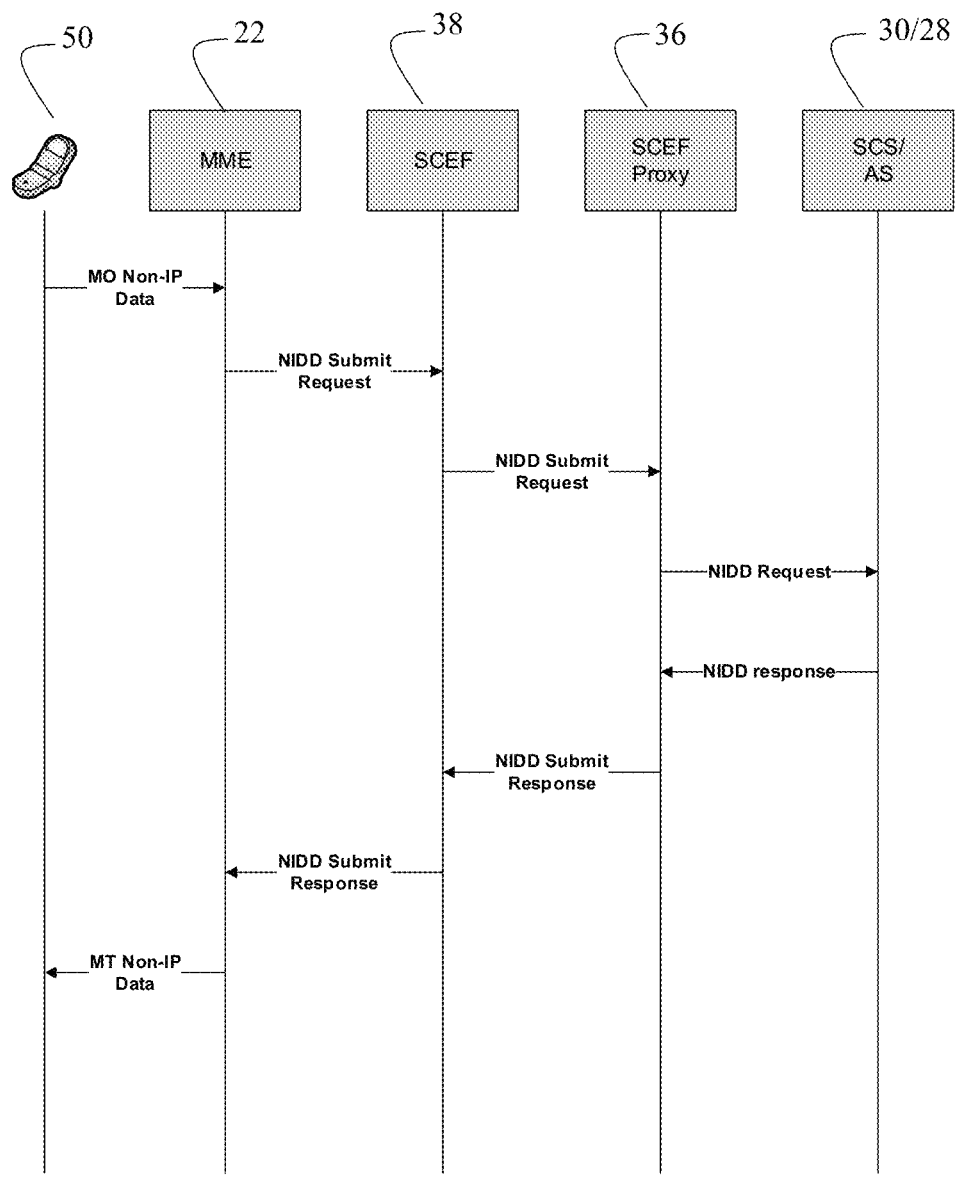
FIG. 20 is a data flow diagram for mobile originated NIDD procedure.

The Monitoring Events and/or NIDD features support charging. Interaction with Offline Charging systems is also supported. Data flow for NIDD configuration procedure is depicted in FIG. 18. FIG. 19 depicts data flow for mobile terminated NIDD procedure, while FIG. 20 depicts data flow for mobile originated NIDD procedure.

Quality of Service (QoS)

SCS 30/AS 28 may request that a data session to a handset that is served by an external service provider (AS session) is set up with a specific QoS (i.e., low latency or jitter) and priority handling. This functionality is exposed via SCEF Proxy 36 towards SCS 30/AS 28. SCS 30/AS 28 can request the network to provide QoS for AS session based on the application and service requirements with the help of a reference to pre-defined QoS information.

Figure 21:
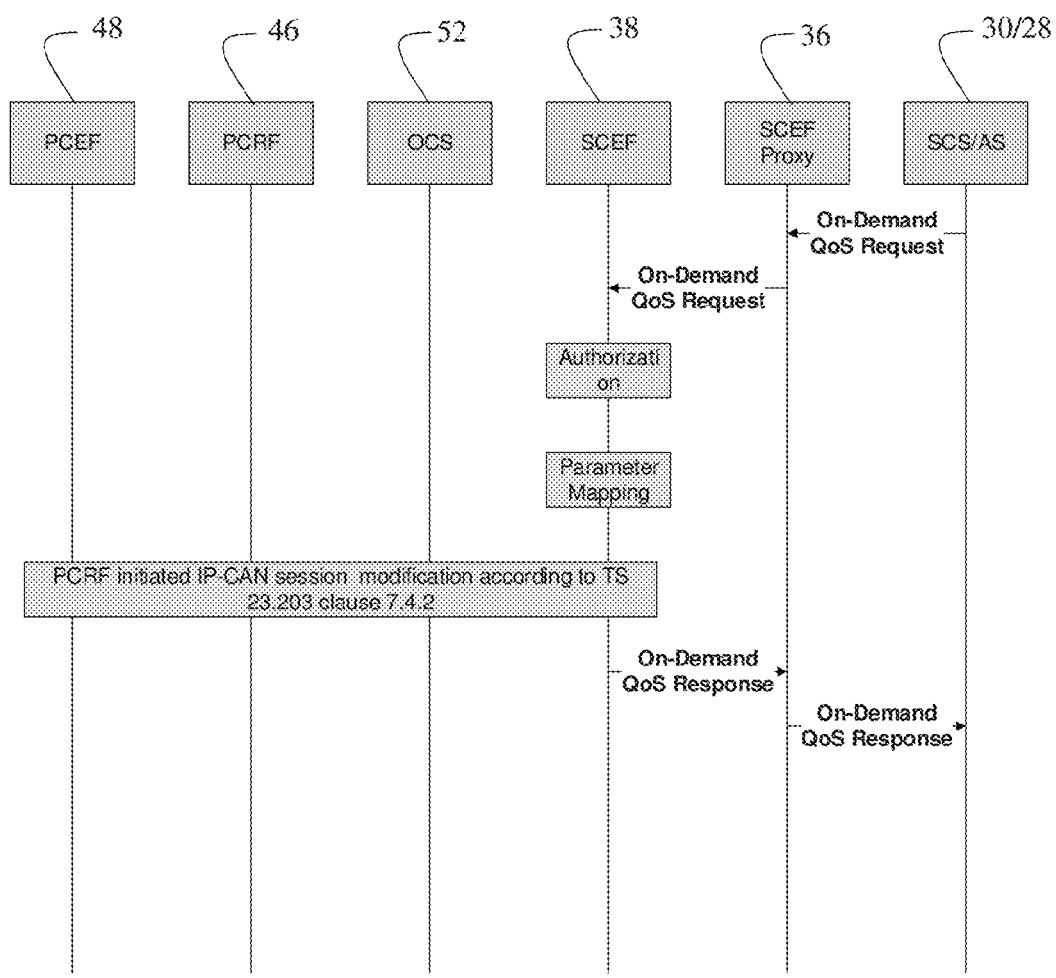
FIG. 21 is a data flow diagram for setting up a 3rd party AS-session with a specific QoS.

When SCEF Proxy 36 receives the request from the SCS 30/AS 28 to provide QoS for an AS session, SCEF Proxy 36 will act as an Application Function (AF) and transfer the request to provide QoS for an AS session to the Policy Charging Rules Function (PCRF) 46 process via an Rx interface. FIG. 21 provides the data flow diagram showing the signaling flow for setting up a 3rd party AS session with a specific QoS.

Applications

Figure 22:
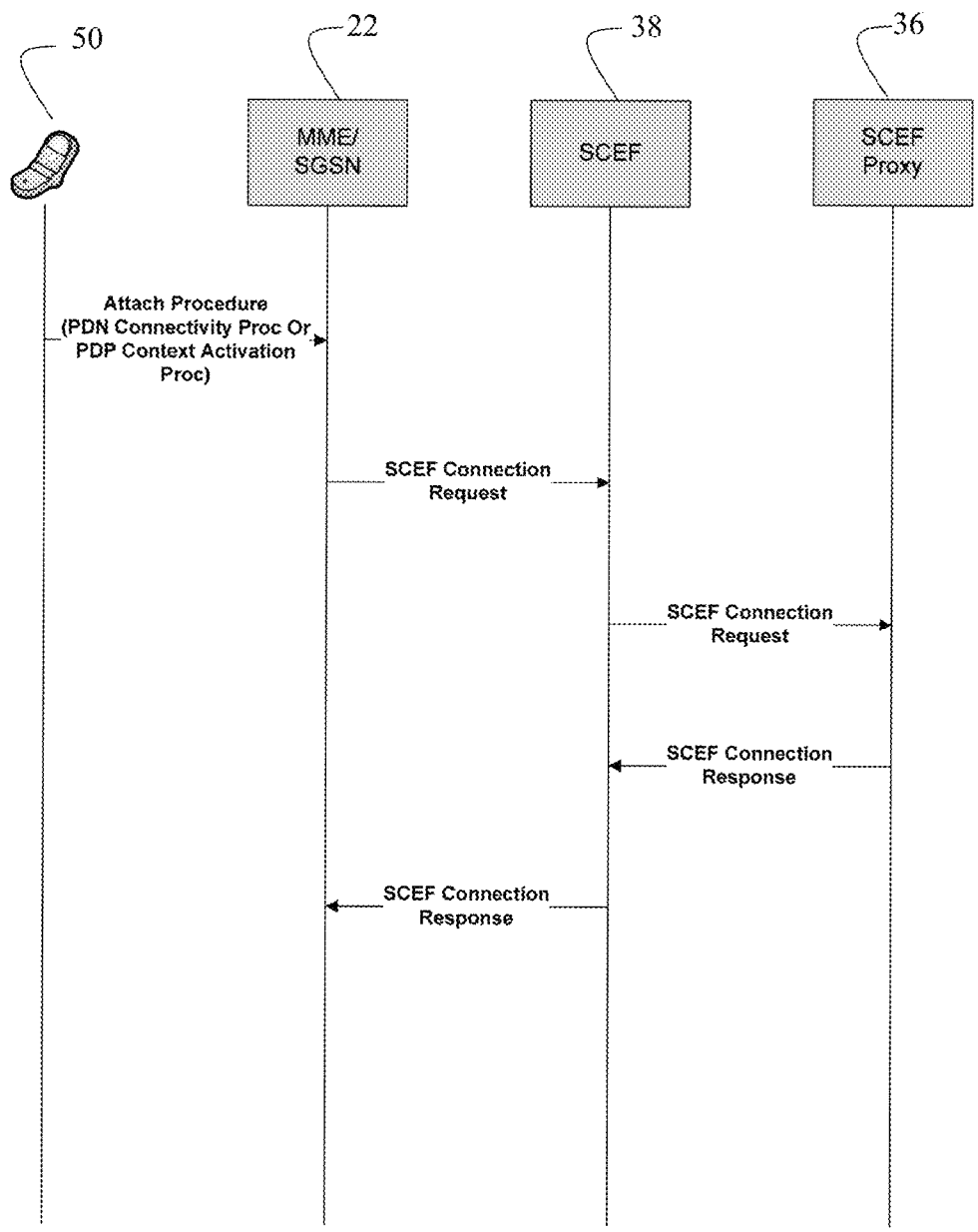
FIG. 22 is a data flow diagram for T6a/T6b connection establishment procedure.
Figure 23:
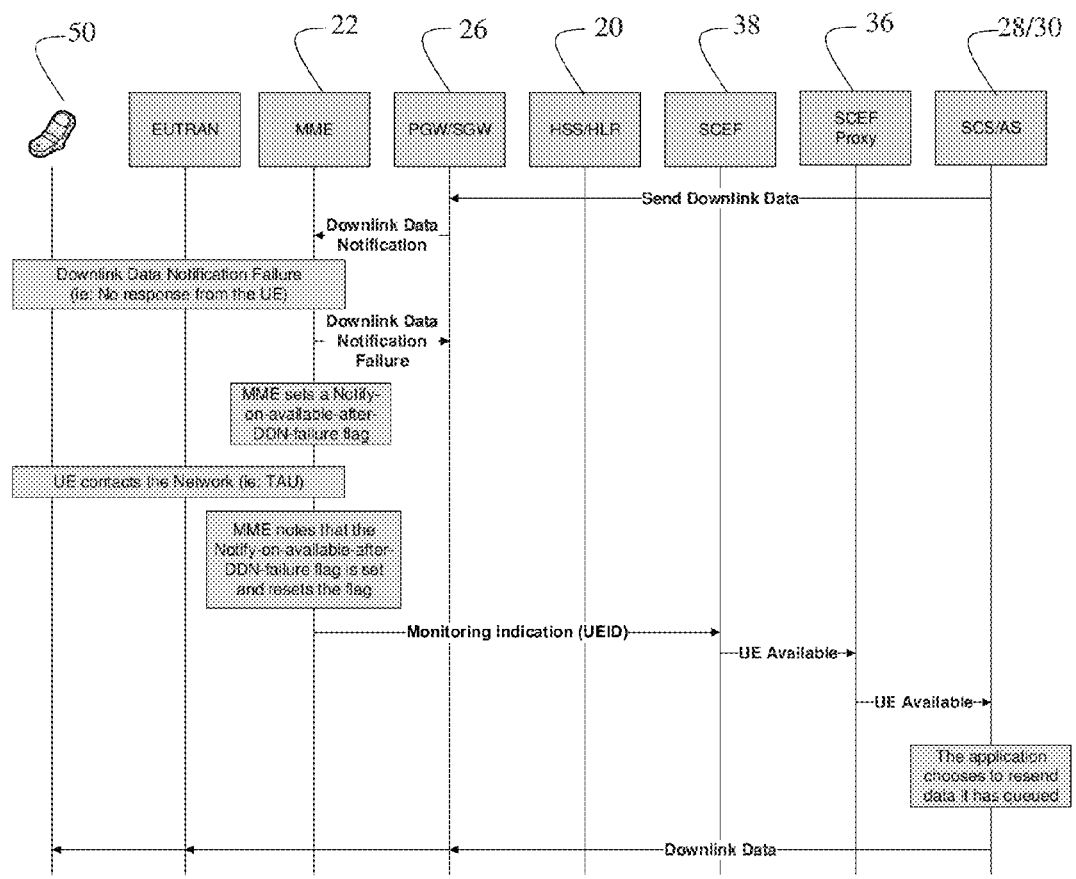
FIG. 23 is a data flow diagram for availability notification after downlink data notification failure.
Figure 24:
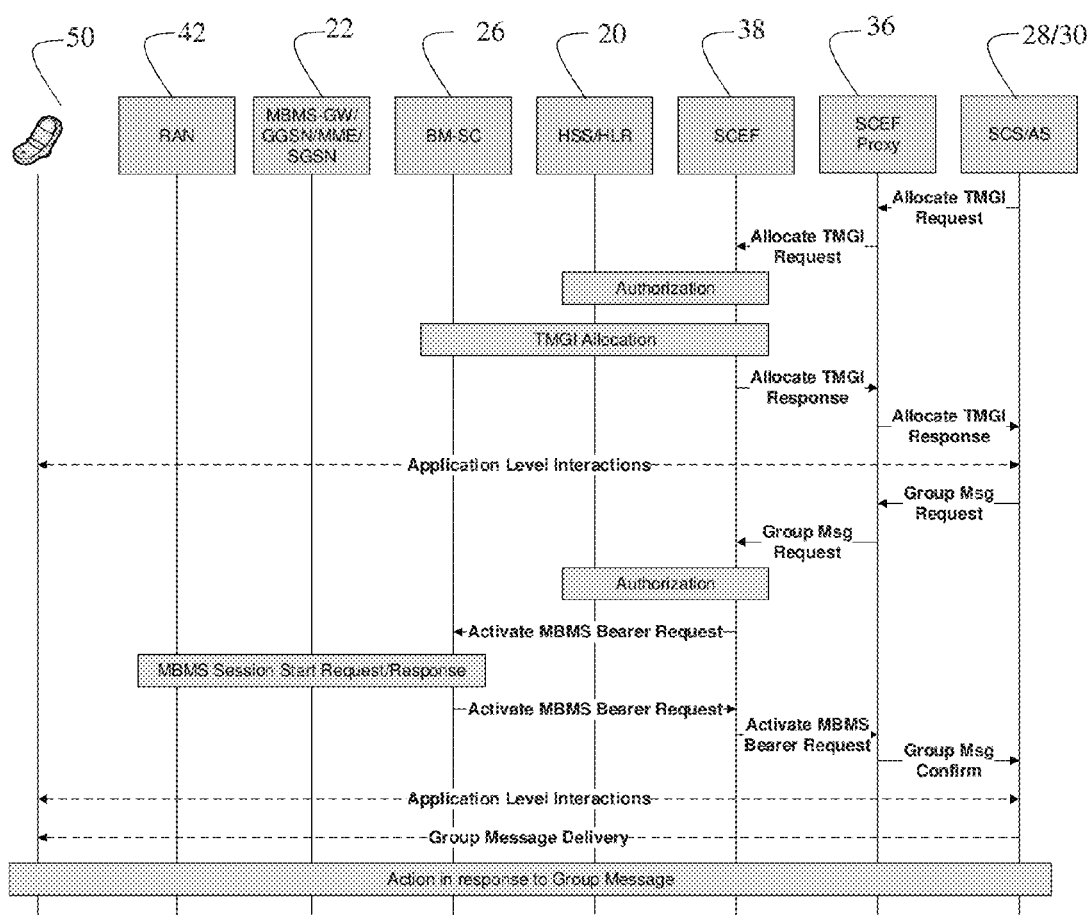
FIG. 24 is a data flow diagram for group message delivery using multimedia broadcast/multicast service.
Figure 25:
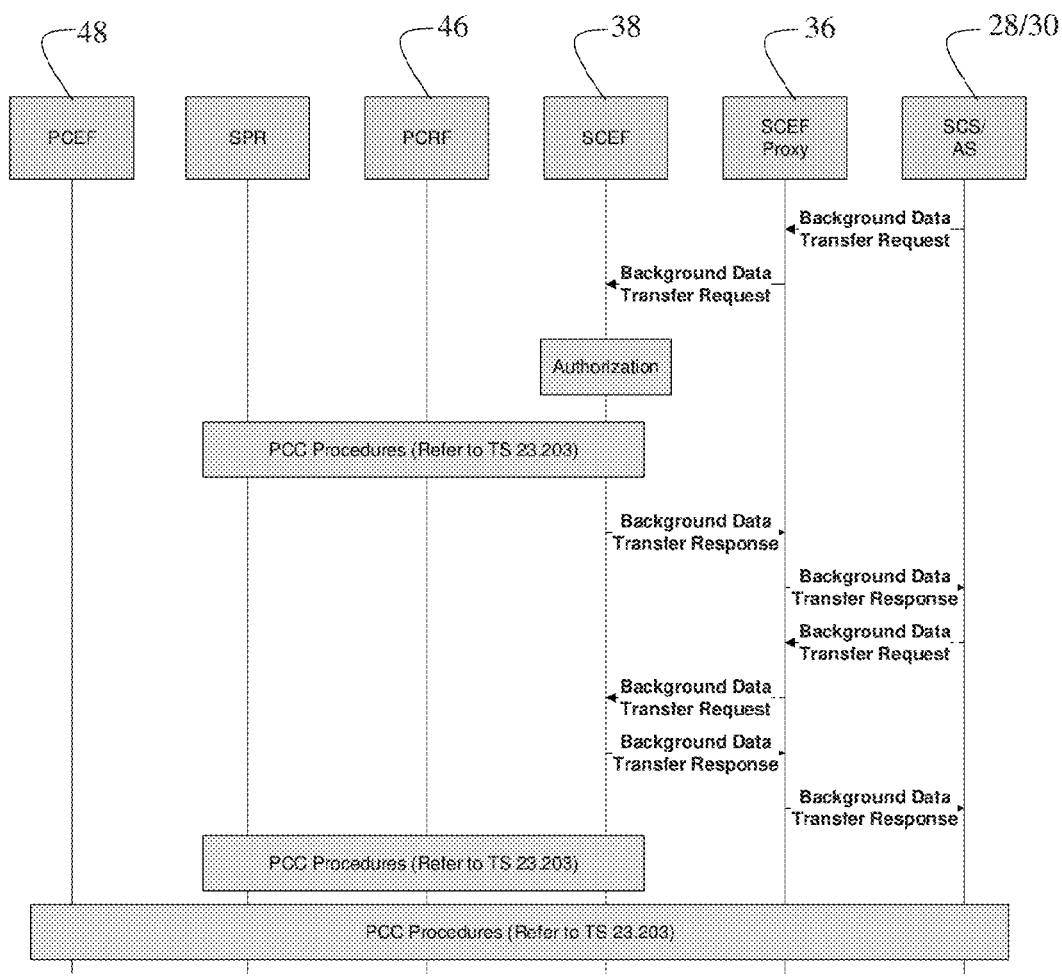
FIG. 25 is a data flow diagram for background data transfer.
Figure 26:
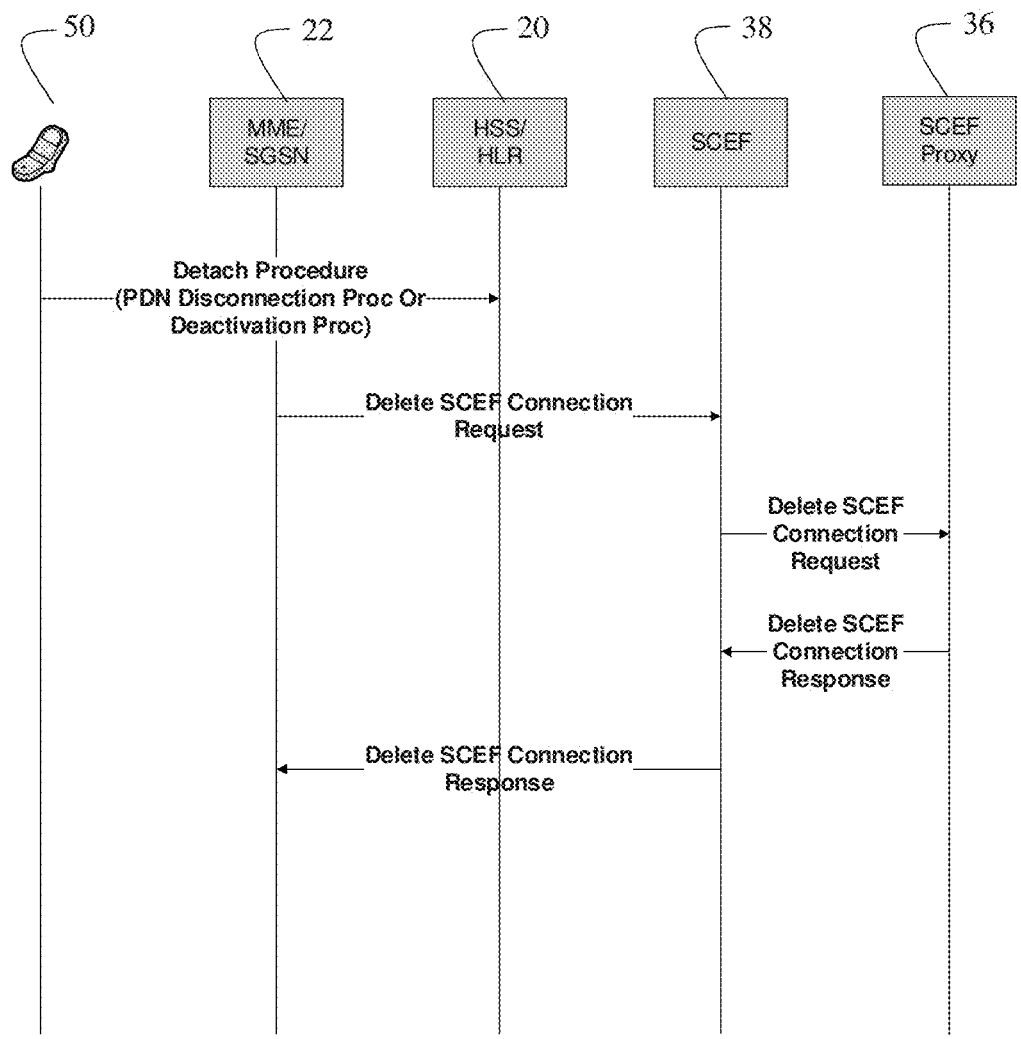
FIG. 26 is a data flow diagram for T6a/T6b connection release procedure.

FIGS. 22-26 provide data flow diagrams for several applications of SCEF Proxy 36. FIG. 22 depicts data flow for T6a/T6b connection establishment procedure. FIG. 23 depicts data flow for availability notification after downlink data notification failure. FIG. 24 depicts data flow for group message delivery using multimedia broadcast/multicast service. Group message delivery efficiently distributes the same content to the members of a group that are located in a particular geographical area on request of the SCS 30/AS 28 via SCEF Proxy 36. FIG. 25 depicts data flow for background data transfer. FIG. 26 depicts data flow for T6a/T6b connection release procedure.

HARDWARE AND SOFTWARE INFRASTRUCTURE EXAMPLES

The present invention may be embodied on various platforms. The following provides an antecedent basis for the information technology that may be utilized to enable the invention.

Embodiments of the present invention may be implemented in hardware, firmware, software, or any combination thereof. Embodiments of the present invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The machine-readable medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any non-transitory, tangible medium that can contain, or store a program for use by or in connection with an instruction execution system, apparatus, or device.

A machine-readable signal medium may include a propagated data signal with machine-readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a computer readable storage medium and that can communicate, propagate, or transport a program for use by or in connection with an instruction execution system, apparatus, or device. However, as indicated above, due to circuit statutory subject matter restrictions, claims to this invention as a software product are those embodied in a non-transitory software medium such as a computer hard drive, flash-RAM, optical disk or the like.

Program code embodied on a machine-readable medium may be transmitted using any appropriate medium, including but not limited to wireless, wire-line, optical fiber cable, radio frequency, etc., or any suitable combination of the foregoing. Machine-readable program code for carrying out operations for aspects of the present invention may be written in any combination of one or more programming languages, including an object oriented programming language such as Java, C#, C++, Visual Basic or the like and conventional procedural programming languages, such as the "C" programming language or similar programming languages.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by machine-readable program instructions.

| GLOSSARY OF TERMS | |
|---|---|
| Term | Definition |
| AS | Application Server |
| CIoT | Cellular Internet of Things |
| C-SGN | CIoT - Serving Gateway Node |
| HLR | Home Location Register |
| HSS | Home Subscriber Server |
| IoT | Internet of Things |
| IP-SM-GW | IP Short Message Gateway |
| IPX | Internetwork Packet Exchange |
| M2M | Machine-to-Machine |
| MME | Mobility Management Entity |
| MNO | Mobile Network Operator |
| MTC | Machine Type Communication |
| MTC-AAA | Machine Type Communication-Authentication, Authorization and Accounting |
| MTC-IWF | Machine Type Communication-Interworking Function |
| NIDD | Non-IP Data Delivery |
| PGW | Packet Data Network Gateway |
| PLMN/PMN | Public Land Mobile Network |
| RAN | Radio Access Network |
| SCEF | Service Capability Exposure Function |
| SCS | Services Capability Server |

-continued

| GLOSSARY OF TERMS | |
| --- | --- |
| Term | Definition |
| SGSN | Serving GPRS Support Node |
| SGW | Serving Gateway |
| SMSC | Short Message Service Center |

The advantages set forth above, and those made apparent from the foregoing disclosure, are efficiently attained. Since certain changes may be made in the above construction without departing from the scope of the invention, it is intended that all matters contained in the foregoing disclosure or shown in the accompanying drawings shall be interpreted as illustrative and not in a limiting sense.

What is claimed is:

1. A method of providing connectivity between a mobile network operator (MNO) and a machine-type-communications (MTC) service provider, comprising:
providing an Internetwork Packet Exchange (IPX) network service;
providing an MTC Interworking Function (MTC-IWF) Proxy hosted on the IPX network surface, the MTC-IWF Proxy being separate from an MTC-IWF of the MNO;
establishing a first connection between the MTC-IWF of the MNO and the MTC-IWF Proxy;
establishing a second connection between the MTC-IWF Proxy and a Services Capabilities Server (SCS) of the MTC service provider; and
establishing a third connection between a Packet Data Network Gateway (PGW) of the MNO and an Application Server (AS) of the MTC service provider, the third connection being via an IPX server; and
providing identity mapping services between a first set of subscriber identifiers used by the MNO and a second set of subscriber identities used by the MTC service provider, thereby enabling a many-to-many connection between multiple MNOs and multiple MTC service providers via the MTC-IWF Proxy.

2. The method of claim 1, wherein the first connection and the second connection use a trigger-service provider (Tsp) interface.

3. The method of claim 1, wherein the MTC-IWF Proxy hides an internal topology of the MNO and relays signaling protocols over a Tsp interface.

4. The method of claim 1, wherein the MTC-IWF Proxy enables the MNO and the MTC service provider to communicate with one another without modifying their internal signaling protocols.

5. The method of claim 1, wherein mutual authentication and security is provided by a transport layer security (TLS), a datagram transport layer security (DTLS), or an internet key exchange (IPSec-IKEv2).

6. The method of claim 1, further comprising a Service Capability Exposure Function (SCEF) Proxy hosted on the IPX server, the SCEF Proxy communicating with a SCEF of the MNO and communicating with the SCS of the MTC service provider, the SCEF Proxy performing the identity mapping services.

7. The method of claim 6, wherein the SCEF Proxy connects to the SCEF and the SCS via Application Programming Interface (API).

8. The method of claim 6, wherein the SCEF Proxy performs one or more functions selected from the group consisting of authentication and authorization; enabling external entities to discover service capabilities of the MTC service provider; policy enforcement; shielding the MNO from requests exceeding predefined permissions; accounting for monitoring events and/or non-IP data delivery (NIDD); and integrity protection, replay protection, and confidentiality protection of a subscriber.

9. The method of claim 6, wherein international mobile subscriber identity (IMSI) of a subscriber is not sent outside of MNO's domain.

10. The method of claim 6, wherein the SCEF Proxy is coupled with the MTC-IWF Proxy.

11. A system for providing connectivity between a mobile network operator (MNO) and a machine-type-communications (MTC) service provider, comprising:
a mobile network operator (MNO);
a machine-type-communications (MTC) service provider;
an Internetwork Packet Exchange (IPX) network service;
an MTC Interworking Function (MTC-IWF) Proxy hosted on the IPX network service;
an MTC-IWF within the MNO, wherein a first connection is established between the MTC-IWF and the MTC-IWF Proxy;
a Services Capabilities Server (SCS) of the MTC service provider, wherein a second connection is established between the SCS and the MTC-IWF Proxy; and
a Packet Data Network Gateway (PGW) within the MNO and an Application Server (AS) of the MTC service provider, wherein a third connection via an IPX server is established between the PGW and the AS; and
providing identity mapping services between a first set of subscriber identifiers used by the MNO and a second set of subscriber identities used by the MTC service provider, thereby enabling a many-to-many connection between multiple MNOs and multiple MTC service providers via the MTC-IWF Proxy.

12. The system of claim 11, wherein the first connection and the second connection use a trigger-service provider (Tsp) interface.

13. The system of claim 11, wherein the MTC-IWF Proxy hides an internal topology of the MNO and relays signaling protocols over a Tsp interface.

14. The system of claim 11, wherein the MTC-IWF Proxy enables the MNO and the MTC service provider to communicate with one another without modifying their internal signaling protocols.

15. The system of claim 11, wherein mutual authentication and security is provided by a transport layer security (TLS), a datagram transport layer security (DTLS), or an internet key exchange (IPSec-IKEv2).

16. The system of claim 11, further comprising a Service Capability Exposure Function (SCEF) Proxy hosted on the IPX server, the SCEF Proxy communicating with a SCEF of the MNO and communicating with the SCS of the MTC service provider, the SCEF Proxy performing the identity mapping services.

17. The system of claim 16, wherein the SCEF Proxy connects to the SCEF and the SCS via Application Programming Interface (API).

18. The system of claim 16, wherein the SCEF Proxy performs one or more functions selected from the group consisting of authentication and authorization; enabling external entities to discover service capabilities of the MTC service provider; policy enforcement; shielding the MNO from requests exceeding predefined permissions; accounting for monitoring events and/or non-IP data delivery (NIDD);

and integrity protection, replay protection, and confidentiality protection of a subscriber.

19. The system of claim 16, wherein international mobile subscriber identity (IMSI) of a user's equipment is not sent outside of MNO's domain.

20. The system of claim 16, wherein the SCEF Proxy is coupled with the MTC-IWF Proxy.

* * * * *